United States Patent [19]
Tanaka et al.

[11] Patent Number: 5,633,737
[45] Date of Patent: May 27, 1997

[54] PROJECTION-TYPE COLOR LIQUID CRYSTAL DISPLAY HAVING TWO MICRO-LENS ARRAYS

[75] Inventors: Naoyuki Tanaka; Takashi Shibatani, both of Tenri; Hiroshi Hamada, Nara; Hiroshi Nakanishi, Tenri, all of Japan

[73] Assignee: Sharp Kabushiki Kaisha, Osaka, Japan

[21] Appl. No.: 361,529

[22] Filed: Dec. 22, 1994

[30] Foreign Application Priority Data

Dec. 24, 1993 [JP] Japan ................................. 5-328805

[51] Int. Cl.⁶ ............................................. G02F 1/1335
[52] U.S. Cl. ............................................. 349/95; 349/5
[58] Field of Search .................................. 359/40, 41, 49

[56] References Cited

U.S. PATENT DOCUMENTS

| | | | |
|---|---|---|---|
| 4,686,519 | 8/1987 | Yoshida et al. | 359/40 |
| 5,052,783 | 10/1991 | Hamada | 359/40 |
| 5,083,854 | 1/1992 | Zampolin et al. | 359/40 |
| 5,161,042 | 11/1992 | Hamada | 359/41 |

FOREIGN PATENT DOCUMENTS

| | | |
|---|---|---|
| 59-230383A | 12/1984 | Japan . |
| 2149837A | 6/1990 | Japan . |
| 2262185A | 10/1990 | Japan . |
| 43856 | 1/1992 | Japan . |
| 5289047A | 11/1993 | Japan . |
| 634963A | 2/1994 | Japan . |
| 6-110050 | 4/1994 | Japan ........................ 359/40 |

OTHER PUBLICATIONS

"A New Bright Single Panel LC-Projection System Without a Mosaic Color Filter" by Messrs. Hamada, Nakanishi, Funada, and Awane; Liquid Crystal Labs, Sharp Corp.; Intl. Display Research Conf., Monterey, CA, Oct. 1994; pp. 422-423.

Primary Examiner—William L. Sikes
Assistant Examiner—Charles Miller

[57] ABSTRACT

A liquid crystal display element, which is installed in a projection-type color liquid crystal display, is provided with the first glass substrate. The first glass substrate is provided with the first micro-lens array on its light-incident side and the second micro-lens array on its light-releasing side. The first micro-lens array converges light beams of respective primary colors onto the vicinity of the light-releasing position on the second micro-lens array. The second micro-lens array makes the incident light beams parallel to each other and releases them from the liquid crystal display element. Thus, even in the case of using a projection lens having a small diameter, it is possible to improve the efficiency of utilization of light. Moreover, this arrangement eliminates the necessity of having to employ a comparatively expensive projection lens with a large diameter, thereby reducing the costs of production.

48 Claims, 17 Drawing Sheets

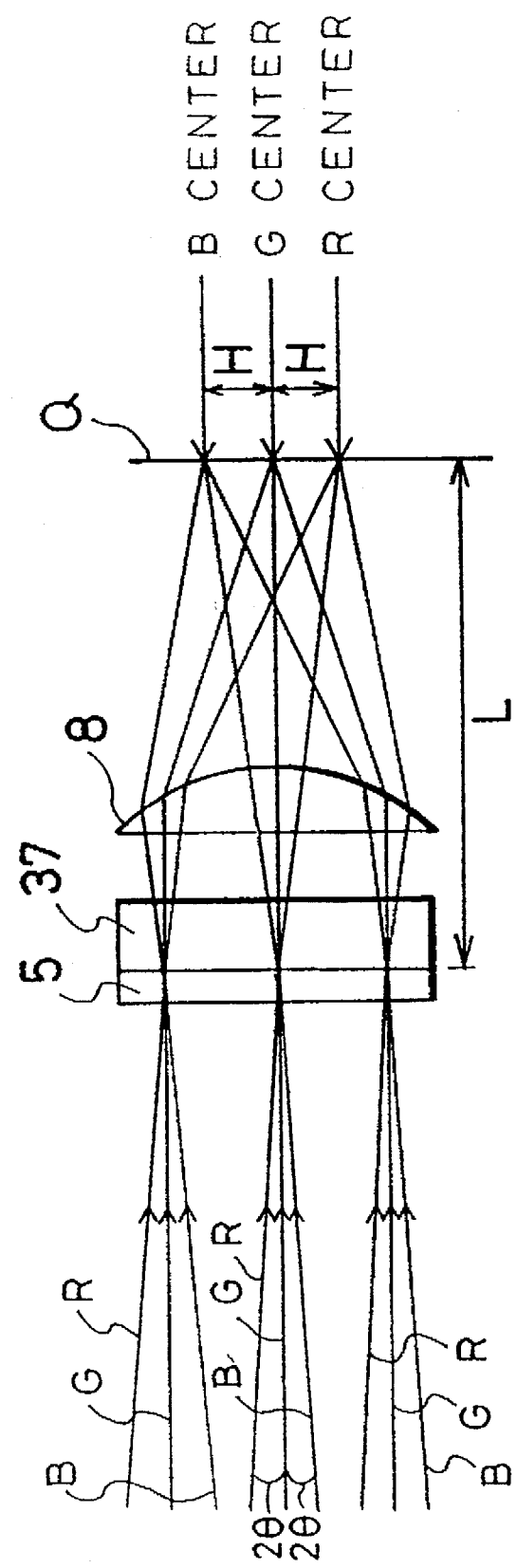

PROJECTION-TYPE COLOR LIQUID CRYSTAL DISPLAY HAVING TWO MICRO-LENS ARRAYS

FIELD OF THE INVENTION

The present invention relates to a projection-type color liquid crystal display of a single-plate type that displays images by the use of a single liquid crystal display element without using a mosaic-shaped color filter, and particularly concerns a projection-type color liquid crystal display that is applied to compact projection-type color liquid crystal television systems and information display systems.

BACKGROUND OF THE INVENTION

In comparison with projection-type Braun-tube displays, the projection-type color liquid crystal displays have the following excellent features, although they require a separate light source because their liquid crystal display element does not emit light: wide color-reproducible ranges are available, and they are portable because of their compactness and light weight; and it is not necessary to adjust convergence since they are not affected by earth magnetism. Therefore, further developments in this field are expected in the future.

There are two projection-type color-image displaying methods wherein liquid crystal display elements are used: a three-plate method wherein three sheets of liquid crystal display element corresponding to the three primary colors are used, and a single-plate method wherein only one sheet thereof is used. In the former three-plate method, an optical system for dividing white light into light beams of the three primary colors, that is, red, green and blue, and three sheets of liquid crystal display element for forming images by controlling the light beams of the respective colors are respectively provided, and the images of the respective colors are optically superimposed to form full-color images. In this arrangement of the three-plate method, it is possible to effectively utilize light emitted from the white-light source, while also obtaining high purity in colors. However, since the color-separation system for dividing colors and the color-composition system for superimposing colors are required as described above, the construction of the optical system tends to become complicated and the number of parts increases; therefore, this method is normally disadvantageous compared to the single-plate method in terms of low costs and miniaturization of the device.

In contrast, in the latter single-plate method, only one sheet of liquid crystal display element is used, and the projection optical system projects light onto the liquid crystal display element that is provided with a color filter having patterns of the three primary colors, for example, in the shape of mosaics or stripes. For example, Japanese Laid-Open Patent Application 230383/1984 (Tokukaishou 59-230383) has disclosed this method. The single-plate method, which uses only one liquid crystal display element and has a simpler construction in its optical system compared to that of the three-plate method, makes it possible to lower the costs and miniaturize the device.

However, in the case of the single-plate method, about two-thirds of incident light is absorbed or reflected by the color filter: only about one-third of incident light is utilized. In other words, the disadvantage of the single-plate method using the color filter is that the illumination of the screen is lowered to about one-third, compared to the three-plate method using a light source that has the same illumination.

In order to solve this problem, for example, Japanese Laid-Open Patent Application 60538/1992 (Tokukaihei 4-60538) has disclosed a color liquid crystal display of the single-plate method wherein, as illustrated in FIG. 14, white light from a white-light source 51 is divided into respective light beams of red, blue and green by the use of dichroic mirrors 54R, 54G and 54B that are disposed in the form of a sector and the utilization efficiency of light is thus improved.

In this display, the respective light beams, which have been divided by the dichroic mirrors 54R, 54G and 54B, are incident on a micro-lens array 55 that is disposed on the light-source side in a liquid crystal display element 57 with respectively different angles. The light beams, which have passed through the micro-lens array 55, are allocated and illuminated onto liquid crystal portions in accordance with the respective incident angles of the light beams. The liquid crystal portions are driven by signal electrodes to which color signals for the respective colors are individually applied. This display makes it possible to provide brighter images compared to displays wherein color filters are used.

However, the color liquid crystal display, which uses the dichroic mirrors 54R, 54G and 54B as the spectral means, has the following disadvantages:

First, the decline in the utilization of light causes a lowering in picture quality. More specifically, as illustrated in FIG. 15, the light beams, which have been converged by the micro-lens array 55 onto pixel apertures that are driven by the signal electrodes 56R, 56G and 56B in the liquid crystal display element 57, tend to diverge with great angles in an expanding manner after having passed through the liquid crystal display element 57; this causes a decline in the utilization of light and a resulting lowering in picture quality.

In contrast, it is possible to project images of good quality onto a screen 60 by employing a lens with a large diameter as a projection lens 59 shown in FIG. 14. However, since the lens is normally an expensive member, the production costs increase, which is the second problem.

Moreover, the inventors of the present invention have pointed out the third problem in the display that is disclosed in the above-mentioned patent publication, that is, the decline in the purity of the three primary colors that might adversely affect the quality of images. This disadvantage is caused by the fact that no specific consideration is given on the arrangement of the dichroic mirrors 54R, 54G and 54B, that is, on the order of dividing colors, as well as the fact that multiple reflection occurs between these dichroic mirrors 54R, 54G and 54B disposed in the form of sector and mixed colors thus tend to be caused.

Referring to FIG. 16(a), the following description will discuss this problem in detail. Here, the figure exemplifies a case where the dichroic mirrors 54B, 54G and 54R, which respectively reflect light beams of blue, green, and red wavelength ranges, are disposed in the form of sector in this order from the white-light source, with their angles shifted by θ respectively. Here, α represents an angle at which white light is incident on the dichroic mirror 54B.

The white light, which is directed to the dichroic mirrors 54B, 54G and 54R, is divided into the following three light beams:

(1) a blue light beam that has been reflected by the dichroic mirror 54B;

(2) a green light beam that passed through the dichroic mirror 54B, was reflected by the dichroic mirror 54G, and again has passed through the dichroic mirror 54B; and (3) a red light beam that passed through the dichroic mirrors 54B and 54G, was reflected by the dichroic mirror 54R, and again has passed through the dichroic mirrors 54B and 54G. In this case, the green light beam is incident on the liquid crystal display element 57 with a tilted angle of 2θ in its travelling direction with respect to the blue light beam, and the red light beam is also incident thereon with a tilted angle of 2θ in its travelling direction with respect to the green light beam.

Here, in actual process, stray light is exerted due to unnecessary reflections, in addition to the above-mentioned light beams. The following description will discuss the causes of stray light in detail.

The dichroic mirrors 54B, 54G and 54R, which are manufactured through a well-known multi-layer thin-film coating technique, have respectively different spectral characteristics depending on the incident angles of light beams. For this reason, each angle at which each light beam is incident is individually determined at the time of designing the mirror in order to obtain desired spectral characteristics (hereinafter, this angle is referred to as the designed incident angle). Therefore, if a light beam is incident at an angle different from the designed incident angle, the desired spectral characteristics are not obtainable, and as the gap between the designed incident angle and the actual incident angle increases, the actual spectral characteristics further diverge from the desired spectral characteristics.

FIG. 16(b) shows the spectral characteristics of the dichroic mirror 54B having the designed incident angle of 45° (which reflects the light beam of a blue wavelength range and transmits the other light beams of the other wavelength ranges) and actual spectral characteristics that the dichroic mirror 54B exhibits when a light beam (natural light) is incident thereon at an angle of 20° that is different from the designed incident angle. Here, in this figure, the spectral characteristics of the 45°-incident angle are indicated by a solid line, and the spectral characteristics of the 20°-incident angle are indicated by a broken line. As clearly shown by the figure, in the case of an incident light beam having an angle smaller than the designed incident angle, a rise in transmittance, which was located in the vicinity of 500 nm, is shifted to the long-wavelength side. Further, ripples (swells like sinusoidal waves in the transmittance curve) appear in the characteristic curve. Furthermore, a step-like portion appears in the vicinity of 50% in transmittance within the portion of the rise. This step-like portion is caused due to a discrepancy in the spectral characteristics with respect to the s-state polarization and p-state polarization in the case of the incidence of natural light, and gives adverse effects on the characteristics in the same manner as the ripples.

For example, when non-polarized natural light is illuminated, the green light beam, which has been reflected by the dichroic mirror 54G, is again incident on the dichroic mirror 54B at an angle that is smaller by 2θ than the designed incident angle α of the dichroic mirror 54B. Therefore, the spectral characteristics of the dichroic mirror 54B are changed, thereby making the reflection range shift toward the long-wavelength side, as well as causing increased ripples. Thus, a portion of the green light, which is supposed to pass through the dichroic mirror 54B, is reflected by the dichroic mirror 54B.

In this manner, as illustrated in FIG. 17(a), stray light M is exerted, although it is a small portion, and when this stray light M again reaches the dichroic mirror 54G, most of the stray light M is reflected by the dichroic mirror 54G. The stray light M, reflected by the dichroic mirror 54G, is again incident on the dichroic mirror 54B. At this time, its incident angle is smaller than α by 4θ, which is the same angle as the light beam of red that is reflected by the dichroic mirror 54R. The travelling direction of the stray light M having passed through the dichroic mirror 54B also makes the same angle as the red light beam does after having passed through the dichroic mirror 54B, and has an angle difference of 4θ with respect to the light beam of blue that the dichroic mirror 54B has first reflected. This means that the stray light M of green is slightly contained in the pixels for modulating the red light beam in the liquid crystal display element 57.

Similarly, the red light beam, which has been reflected by the dichroic mirror 54R, is incident on the dichroic mirrors 54G and 54B at angles that are smaller than the designed values by 2θ and 4θ respectively. For this reason, each of the dichroic mirrors 54G and 54B has a shift in its rise in the spectral characteristics in the same manner, thereby causing a portion of the red light beam to be reflected by the dichroic mirrors 54G and 54B. Stray light N, which is caused in this case, is light that was reflected by the dichroic mirror 54R, and passed through the dichroic mirrors 54G and 54B, or light that was reflected by the dichroic mirror 54G, and passed through the dichroic mirror 54B. This stray light N, which has an angle difference of 2θ with respect to the red light beam, is incident on the liquid crystal display element 57 at an angle that is different from any angles of the blue, green and red light beams.

There are still other stray lights that are caused by further reflections of light; however, these stray lights hardly give adverse effects on the purity in colors. The reason for this is that the light intensity is decreased as the reflections are repeated, and that the incident angles onto the liquid crystal display element are increased with respect to the optical axis as the reflections are repeated so that they exceed the effective diameter of the projection lens that is regulated by the F-value thereof.

As illustrated in FIG. 17(b), the stray lights M and N cause mixed colors when the micro-lens array 55 allocates the respective light beams onto the pixels that are driven by the signal electrodes 56B, 56G and 56R in the liquid crystal display element 57. Additionally, the signal electrodes 56B, 56G and 56R are associated with the respective colors, blue, green, and red, and these three electrodes form a unit to which a predetermined one of micro-lenses constituting the micro-lens array allocates the light beams.

In this arrangement, the stray light M (green) is incident on the liquid crystal display element 57 at the same angle as the red light beam that has been reflected by the dichroic mirror 54R, and is thus incident on the signal electrode 56R together with the red light beam. Moreover, the stray light N (red) tends to be incident on a signal electrode 56B', shown in FIG. 17(b), that is a signal electrode that is associated with another micro-lens. Consequently, the purity in the three primary colors deteriorates due to stray lights.

SUMMARY OF THE INVENTION

It is an objective of the present invention to provide a projection-type color liquid crystal display which achieves full-color images in high quality without causing disadvantages, such as a decline in the utilization efficiency of light and a lowering in color purity.

In order to achieve the above-mentioned objective, the projection-type color liquid crystal display of the present invention is provided with:

(1) a white-light source for emitting a white-light beam;
(2) a light-beam divider for dividing the white-light beam into light beams consisting of a plurality of color rays having respectively different wavelength ranges;

(3) a liquid crystal display element including a face whereon pixels corresponding to the respective color rays are regularly disposed, the liquid crystal display element being arranged so that the incident color rays are modulated and transmitted through the pixels;

(4) a first micro-lens array for converging the color rays of the light beams onto corresponding pixel apertures in the liquid crystal display element, each color ray being allocated with respect to each wavelength range; and (5) a second micro-lens array for deflecting the light beams so that their respective principal rays are aligned in parallel with one another.

With this arrangement, the first micro-lens array converges the color rays having respectively different wavelength ranges so that each color ray is directed to a pixel aperture corresponding to its wavelength range in the liquid crystal display element. These light beams consisting of a plurality of color rays, which are illuminated onto the liquid crystal display element with respectively different incident angles, tend to diverge in accordance with their respective incident angles after having been subjected to the convergence by the first micro-lens array. However, the principal rays of these light beams are aligned in parallel with one another by the second micro-lens array.

In other words, by making the principal rays of the light beams parallel to each other by the use of the second micro-lens array, it is possible to suppress the diffusion of light and improve the utilization efficiency of light. This enables brighter color images with better white balance. Further, since this arrangement eliminates the necessity of having to install a projection lens with a large diameter and other members, which have been conventionally used, it is possible to reduce the costs of production.

Moreover, another arrangement may be adopted, which includes:

(1) a white-light source for emitting a white-light beam;

(2) a light-beam divider for extracting a plurality of color rays having respectively different wavelength ranges from the white-light beam in the order of their greater wavelength ranges starting from the longest wavelength side;

(3) a liquid crystal display element on which the color rays are incident and through which the color rays are modulated;

(4) a micro-lens array for converging the color rays onto corresponding pixel apertures in the liquid crystal display element, each color ray being allocated with respect to each wavelength range; and (5) a projector for projecting the color rays that have been modulated by the liquid crystal display element.

In this arrangement, the light-beam divider extracts the respective color rays in the order of their greater wavelength ranges starting from the longest wavelength side, and divides the white-light beam into the color rays having respectively different wavelength ranges. As described above, with the arrangement for dividing the white-light beam successively from the longest wavelength, even if light, reflected from another dichroic mirror, is incident at an angle different from the designed incident angle, it is possible to prevent the occurrence of stray light independent of the changes in the spectral characteristics. Therefore, it is possible to suppress mixed colors and improve the purity in the respective color rays; this provides wider color-reproducible ranges, and achieves full-color images having high picture-quality.

Moreover, the following members may be at least included as the light-beam divider:

(1) the first dichroic mirror for reflecting the red ray;

(2) the second dichroic mirror for reflecting the yellow ray; and (3) the third dichroic mirror for reflecting the blue ray.

In this arrangement, the red ray is first separated by the first dichroic mirror, and the second dichroic mirror, which is capable of separating the yellow ray, that is, rays corresponding to red and green wavelength ranges, is used to separate only the green ray because the red ray has already been separated. Then, the blue ray is further separated by the third dichroic mirror.

Thus, the white-light beam is separated into the three primary colors even if the yellow dichroic mirror is adopted in place of the green dichroic mirror. In general, compared to the green dichroic mirror, the yellow dichroic mirror is manufactured at low costs while maintaining a high wavelength selectivity. Therefore, the above-mentioned arrangement makes it possible to improve the purity in colors and provide high-quality images, as well as making it possible to reduce the production costs of the device.

Further, a corrector, which reduces at least rays corresponding to yellow and cyan wavelength ranges with respect to the characteristics of the white-light source, may be included in the arrangement. Thus, it becomes possible to reduce the rays corresponding to yellow and cyan wavelength ranges that cause a decline in the purity in colors, thereby providing images with higher color-purity.

Moreover, still another arrangement may be adopted, which further includes:

(1) a polarizing plate that is installed on the light-incident side in the liquid crystal display element; and (2) a polarization-axis rotator for rotating the polarization axis of either p-state polarization or s-state polarization to a direction in which the polarization axis is coincident with the transmitting axis of the polarizing plate, the polarization-axis rotator being installed between the light-beam divider and the polarizing plate.

In this arrangement, the light-beam divider has a plurality of dichroic mirrors whose spectral characteristics are set so as to deal with the above-mentioned polarization. Thus, the mirrors have better wavelength selectivity compared to the dichroic mirrors that are designed to deal with natural light, and since the polarization-axis rotator rotates the polarization axis, only the polarized light component that corresponds to the design of the dichroic mirrors is allowed to pass through the polarizing plate. Therefore, it becomes possible to provide high-quality images with higher color-purity.

Furthermore, the other arrangement may be adopted, which includes:

(1) a white-light source for emitting a white-light beam;

(2) a light-beam divider for dividing the white-light beam into light beams consisting of color rays having respectively different wavelength ranges;

(3) a liquid crystal display element on which the color rays are incident and through which the color rays are modulated and transmitted;

(4) a screen;

(5) a projection lens for projecting onto the screen the color rays that have been modulated by the liquid crystal display element; and (6) a wavelength selector having selection areas that transmit only rays having wavelength ranges corresponding to the respective color rays, the wavelength selector being installed on the entrance pupil of the projection lens.

In this arrangement, it is possible to shield rays having wavelength ranges other than the wavelength ranges corresponding to the respective single-color rays from the light beams that have been incident on the respective pixels in the liquid crystal display element. Therefore, even in the case of using a white-light source that emits a light beam with poor light expand angle in order to make the device more compact, or even in the case of having stray light when a white light beam is divided into a plurality of color rays having respectively different wavelength ranges, it becomes possible to suppress mixed colors, thereby providing high-quality illuminated images with higher color-purity.

For a fuller understanding of the nature and advantages of the invention, reference should be made to the ensuing detailed description taken in conjunction with the accompanying drawings.

BRIEF DESCRIPTION OF THE DRAWINGS

FIG. 11 is a schematic illustration showing a positional relationship between liquid crystal elements and a projection lens that are installed in the projection-type color liquid crystal display of FIG. 10.

DESCRIPTION OF THE EMBODIMENTS

[EMBODIMENT 1]

Figure 1A:
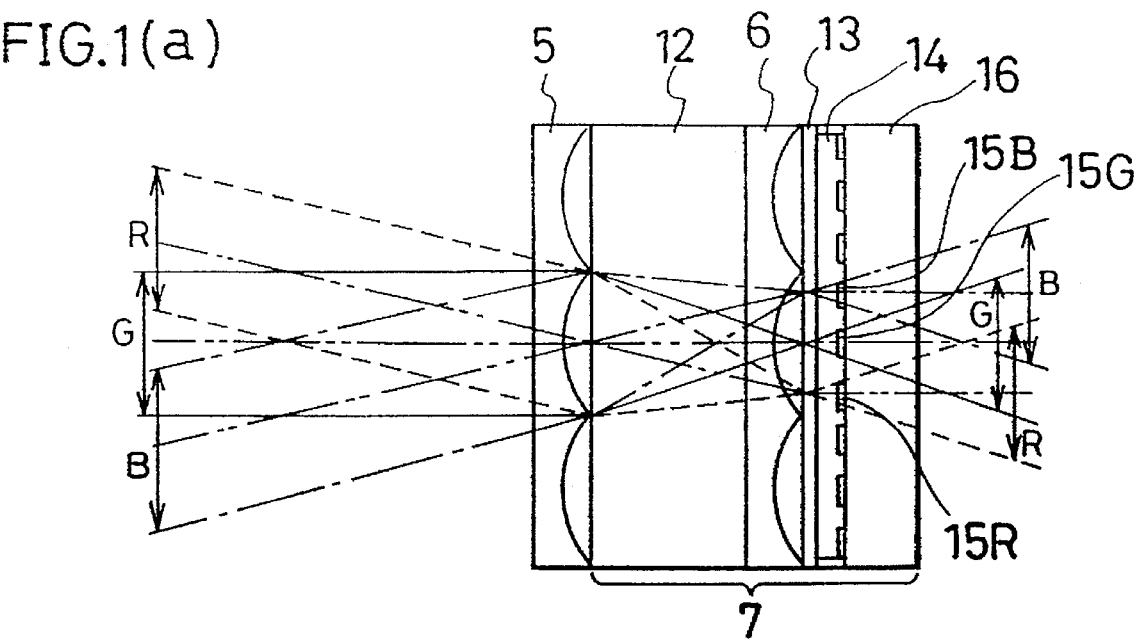
FIGS. 1(a) and 1(b) are cross-sectional views, each showing liquid crystal elements and a micro-lens array that are installed in a projection-type color liquid crystal display in one embodiment of the present invention.
Figure 1B:
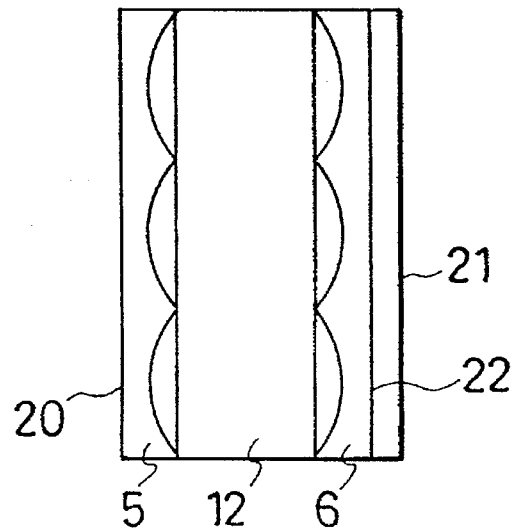
Figure 2:
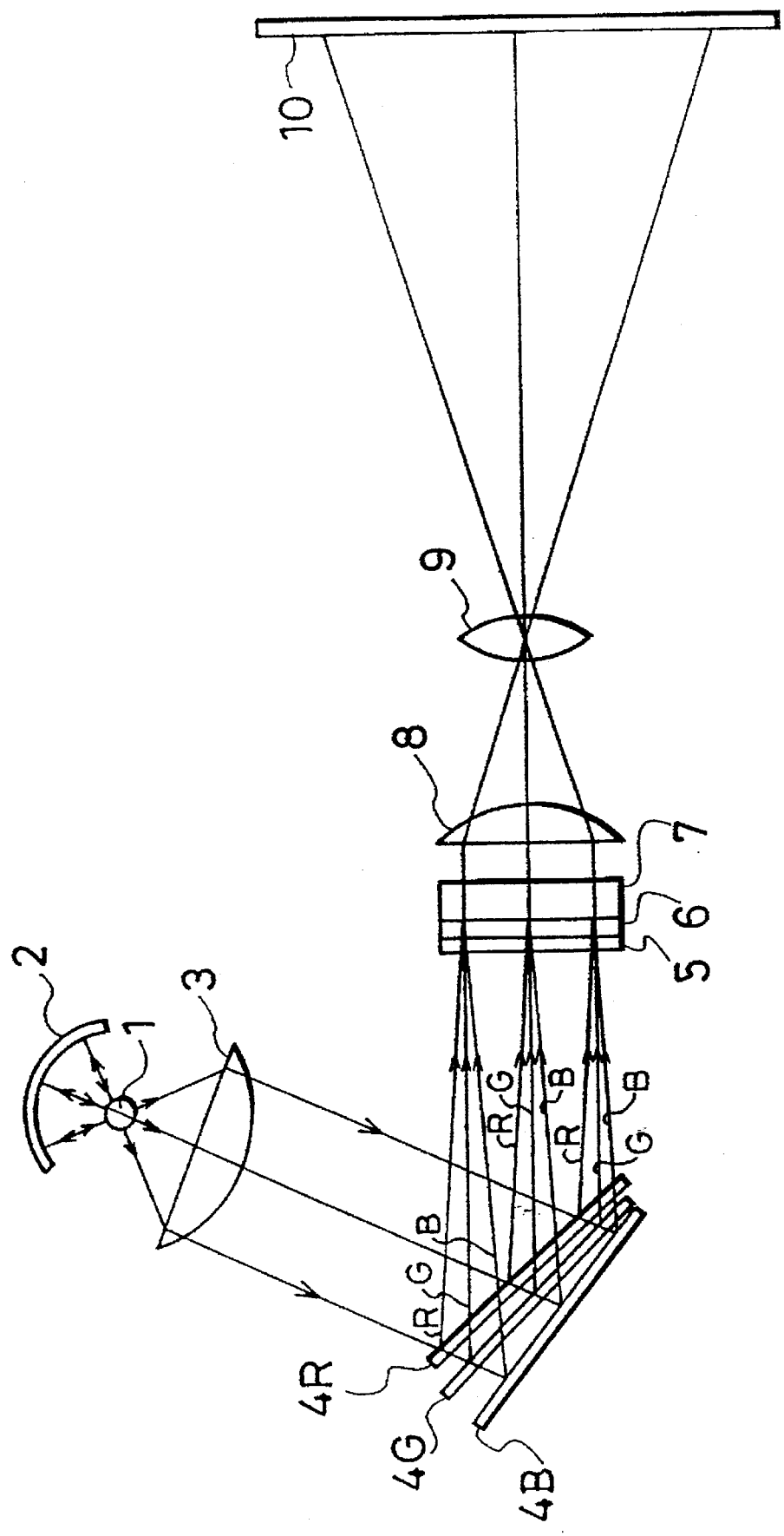
FIG. 2 is a schematic illustration showing a construction of the projection-type color liquid crystal display that is provided with the liquid crystal elements of FIG. 1.

Referring to FIGS. 1 and 2, the following description will discuss one embodiment of the present invention.

FIG. 2 is a schematic illustration showing a projection-type color liquid crystal display in accordance with one embodiment of the present invention. In the present embodiment, a metal halide lamp of 150 W, AL=5 mm in arc length, and A$\phi$=2.2 mm in arc diameter, is used as a white-light source 1. The while-light source 1 is disposed in such a manner that its arc is perpendicular to the surface of the drawing. In place of the metal halide lamp, other lamps, such as a halogen lamp or a xenon lamp, may be adopted as the white-light source 1.

A spherical mirror 2 is installed on the back side of the white-light source 1. The spherical mirror 2 is disposed so that its center is coincident with the center of the light-emitting section of the white-light source 1. A condenser lens 3 of 80 mm$\phi$ in diameter and fc=60 mm in focal distance is installed in front of the white-light source 1. The condenser lens 3 is disposed so that its focal point is coincident with the center of the light-emitting section of the white-light source 1. With this arrangement, virtually parallel beams of white light are obtained from the condenser lens 3.

In this case, the light expand angle $\theta_W$ of the beams in the arc-length direction (in the direction perpendicular to the surface of the drawing) as well as the light expand angle $\theta_W$ of the beams in the arc-diameter direction (in the direction in parallel with the surface of the drawing) is found from the following equation (1).

$$\theta_W = \tan^{-1}(AL/fc) \approx 4.8°$$
$$\theta_W = \tan^{-1}(A\phi/fc) \approx 2.1° \tag{1}$$

The method for obtaining the parallel beams from the white-light source 1 is not limited to the above-mentioned arrangement; other methods, such as using a paraboloidal mirror or using an ellipsoidal mirror and an integrator, may be adopted, as occasion demands.

In front of the condenser lens 3, are disposed dichroic mirrors 4R, 4G and 4B (light-beam divider) of three types, which are aligned in the optical axis in this order with respectively different angles. The dichroic mirrors 4R, 4G and 4B have such characteristics that they selectively reflect light beams of respective wavelength ranges corresponding to red, green and blue, and transmit the light of other wavelength range. Here, R, G, and B represent respective colors of red, green and blue.

These dichroic mirrors 4R, 4G and 4B are provided by using a well-known multi-layer thin-film coating technique. The multi-layered thin-films are respectively formed so that the dichroic mirror 4R for red reflects visual light having wavelengths longer than about 600 nm, the dichroic mirror 4B for blue reflects visual light having wavelengths shorter than about 400 nm, and the dichroic mirror 4G for green reflects visual light having wavelengths in the range of about 500 nm to 570 nm.

The dichroic mirror 4B, which is disposed at the farthest station from the white-light source 1, only needs to reflect the visual light that remains after passing through the dichroic mirrors 4R and 4G, that is, after reflections made by the dichroic mirrors 4R and 4G, and does not need to reflect light having the other wave-length ranges. It is preferable to design each of the dichroic mirrors 4R, 4G, and 4B to transmit infrared rays. Since this arrangement prevents infrared rays from reaching the liquid crystal display element, it is possible to lower the temperature of the liquid crystal display element.

Among the three dichroic mirrors 4R, 4G, and 4B, the dichroic mirror 4R, which is disposed at the closest station to the white-light source 1, is arranged so that the light beams from the white-light source 1 are incident thereon with an angle of, for example, around 30°. The other dichroic mirrors 4G and 4B are arranged so that they successively incline by the angle of $\theta$ from the state parallel to the dichroic mirror 4R, around an axis perpendicular to the surface of the drawing as a rotation axis. This angle $\theta$ is calculated from the pitch P of pixel alignment of a liquid crystal display element 7 and the focal distance $f\mu$ of a micro-lens array 5 installed in the liquid crystal display element 7, both of which will be described later. When the dichroic mirrors 4R, 4G and 4B are arranged as described above, the light beams that correspond to the respective red-wavelength range, green-wavelength range and blue-wavelength range are incident on the micro-lens array 5 with an angle of deviation of $2\theta$ between the respective adjacent light beams.

As illustrated in FIG. 1(a), in the present embodiment, the light beam of green is normal incident on the micro-lens array 5, while the light beams of red and blue have such angles that they are located symmetrically with the light beam of green located in the center, on the surface of the drawing.

Further, in the present embodiment, the white light is divided into three primary colors by the dichroic mirrors 4R, 4G and 4B; however, another arrangement may be applied to the present invention, wherein it is divided into four or more colors. In the case of using four or more divided colors, the present invention may be applied to, for example, graphic displays.

The liquid crystal display element 7 is provided with a pair of glass substrates 12 and 16. The first glass substrate 12 is disposed on one surface on which light is incident in the liquid crystal display element 7 and the second glass substrate 16 is disposed on the other surface from which light is released. The first and second micro-lens arrays 5 and 6 are installed on the respective sides of the first glass substrate 12. Liquid crystal is sealed between the second glass substrate 16 and the second micro-lens array 6, thereby forming a liquid crystal layer 14. On the surface of the second glass substrate 16 that faces the second micro-lens array 6, are formed signal electrodes 15R, 15G and 15B that drive the liquid crystal using the simple-matrix driving method. The signal electrodes 15R, 15G and 15B are shaped into stripes that are parallel to one another in the lengthwise direction. Further on the second micro-lens array 6 that faces the second glass substrate 16, is formed a scanning electrode 13 that is orthogonal to the signal electrodes 15R, 15G and 15B.

Both the signal electrodes 15R, 15G and 15B and the scanning electrode 13 are made of transparent conductive films. R, G, and B signals are inputted to the signal electrodes 15R, 15G and 15B respectively. In the present embodiment, a simple-matrix-type liquid crystal display element is used as the liquid crystal display element 7, wherein the number of the scanning electrodes is 220, the pitch of the scanning electrodes is 200 μm, the number of the signal electrodes is 600; and the pitch of the signal electrodes is 100 μm, and which is operational in the super twisted nematic (STN) mode.

It is not necessary to apply mosaic color filters, which have been required in the prior art arrangements, to the liquid crystal display element 7. The allocation of the driving signals is made by using the longitudinal stripes, and picture signals corresponding to the respective colors are applied to the signal electrodes 15R, 15G and 15B. Here, polarizing plates, alignment films and other elements of the liquid crystal display element 7 are omitted from the drawing.

As illustrated in FIG. 1(b), levelling layers 20 and 22 are respectively formed on the respective surfaces of the first and second micro-lens arrays 5 and 6. Further, a cover glass 21 is installed on the surface of the levelling layer 22 that is formed on the second micro-lens array 6. For use as the first and second micro-lens arrays 5 and 6, a lenthicular-lens substrate is adopted, wherein lenthicular lenses (each having a shape that is formed by cutting a circular cylinder or an elliptical cylinder along a plane in parallel with a generator thereof), which has a width of 300 μm corresponding to a set of three signal electrodes 15R, 15G and 15B, are arranged on a transparent substrate by using the ion-exchanging method. Its focal distance is set to be virtually the same as the thickness t=1.1 mm that is the sum of the thickness of the first glass substrate 12 and the thickness of the second micro-lens array 6 in the liquid crystal display element 7. Here, when measured in the air, the focal distance of the first micro-lens array 5 is t/n≅1.1 mm/1.53≅0.72 mm, wherein n represents the refractive index of the first glass substrate 12.

The first and second micro-lens arrays 5 and 6, which have the above-mentioned arrangement, are bonded to the respective sides of the first glass substrate 12 such that the lengthwise direction of the lenthicular lenses is parallel to the longitudinal direction of the signal electrodes 15R, 15G and 15B in the liquid crystal display element 7.

Additionally, as to the manufacturing methods of the first and second micro-lens arrays 5 and 6, the following methods may be adopted: the ion-exchanging method (see Appl.Opt.Vol.21, p.1052(1984) or Electron.Lett.Vol.17, p.452(1981); the swelling method (Suzuki et al. "New Manufacturing Method for Plastic Micro-lens", the 24th Convention of the Institute of Micro-optics); the method described in [Zoran D.Popovic et al. "Technique for monolithic fabrication of micro-lens arrays", Appl.Opt.Vol.27, p.1281 (1988)]; the evaporation method [Japanese Laid-Open Patent Publication 135808/1980 (Tokukaishou 55-135808)]; the thermal transferring method [Japanese Laid-Open Patent Publication 64158/1986 (Tokukaishou 61-64158)]; the machining method; the method disclosed in Japanese Laid-Open Patent Publication 248125/1991 (Tokukaihei 3-248125); and other methods.

Moreover, as to the first glass substrate 12, the same effects can be obtained in the case when the orientation of the first and second micro-lens arrays 5 and 6 is reversed in the arrangement of FIG. 1(b). Furthermore, the levelling layers 20 and 22 and the cover glass 21 may be omitted depending on the conditions of the materials and manufacturing methods of the micro-lenses as well as on the manufacturing processes of the liquid crystal display element.

When parallel light beams are illuminated onto the first micro-lens array 5 in a predetermined direction, the micro-lens array 5 converges the respective light beams in the vicinity of the light-releasing side of the second micro-lens array 6 in the form of lines with the pitch of 300 μm that corresponds to the pitch of the lenticular lenses. Supposing that the focal distance of the first micro-lens array 5 is $f\mu$, the width W of the converged-light line is found from the following equation (2) in relation to the aforementioned light expand angle $\theta_W$ of light from the light source.

$$W = f\mu \times \tan\theta_W \qquad (2)$$

When the aforementioned Equation (1) is substituted in this Equation (2), the following value is obtained:

$$\begin{aligned} W &= A\phi(\text{arc diameter of light source}) \times f\mu(\text{focal} \\ &\quad \text{distance of micro-lens})/fc(\text{focal distance of} \\ &\quad \text{condenser lens}) \\ &= 2.2 \text{ mm} \times 0.72 \text{ mm}/60 \text{ mm} = 26.4 \text{ μm} \end{aligned} \qquad (3)$$

The thicknesses of the scanning electrode 13 and the liquid crystal layer 14 are minute compared to the focal distance of the first micro-lens array 5; therefore, they are negligible. For this reason, the width W of the converged-light lines is assumed to be the width We of the respective light beams that are illuminated onto the signal electrodes 15R, 15G and 15B. Thus, We≅26.4 μm holds, and the width We falls within the signal electrodes 15R, 15G and 15B that are formed in the shape of stripes having the aforementioned pitch.

Further, supposing that the relative angle between the respective dichroic mirrors 4R, 4G and 4B is θ, the light beams of red, green and blue, which are reflected by the dichroic mirrors 4R, 4G and 4B and are incident on the first micro-lens array 5, have a difference of 2θ in their respective incident angles between the adjacent incident light beams of red, green and blue. Here, supposing that the pitch of the pixels is P and that the focal distance of the first micro-lens array 5 is fμ, the following relationship should be satisfied in order that the converged-light lines of red, green and blue, which have been converged by the first micro-lens array 5, are formed on the corresponding pixels.

$$P = f\mu \times \tan 2\theta \qquad (4)$$

Thus, the converged-light lines corresponding to the respective colors fall within the three adjacent signal electrodes 15R, 15G and 15B that are associated with one micro-lens (lenthicular lens) constituting one element of the first micro-lens array 5. For example, in the present embodiment, the following setting is made in order to satisfy the above-mentioned equation:

$$2\theta = \tan^{-1}(100/720) = 8° \qquad (5)$$

Additionally, as to the focal distance of the second micro-lens array 6, fμ is set to the same value as the first micro-lens array 5.

As illustrated in FIG. 2, in front of the light-releasing side of the liquid crystal display element 7, a field lens 8 and a projection lens 9 are disposed. Further, in front of the projection lens 9, a screen 10 is disposed. The focal distance of the field lens 8 is set to a distance between the field lens 8 and the projection lens 9. Thus, the light beams of the respective colors, released from the liquid crystal display element 7, are converged by the field lens 8 to a position at which the projection lens 9 is disposed. The converged light beams are further illuminated onto the screen 10 by the projection lens 9. Additionally, without using the field lens 8, another arrangement may be adopted, wherein the light beams are directly directed from the liquid crystal display element 7 onto the projection lens 9.

With this arrangement, when white light is illuminated from the white-light source 1 to the dichroic mirrors 4R, 4G and 4B, the dichroic mirrors 4R, 4G and 4B reflect the respective light beams having different wave-length ranges, thereby dividing the white light into the primaries. The light beams of the respective colors are directed to the first micro-lens array 5 with the respectively different angles as described earlier in accordance with the angles at which the dichroic mirrors 4R, 4G and 4B are disposed.

Further, the light beams of the respective colors pass through the first micro-lens array 5 and the second micro-lens array 6, and are converged onto the signal electrode 15R, 15G and 15B in relation to their respective colors. In this case, the signal electrodes 15R, 15G and 15B are driven by picture signals that relate to the colors converged onto the respective electrodes such that the light beams of the respective colors are modulated in their intensity in accordance with the signals. The light beams, after having been modulated, pass through the field lens 8 and the projection lens 9, and are illuminated onto the screen 10, thereby allowing color images to be displayed on the screen 10.

Here, as described earlier, in a conventional projection-type color liquid crystal display, principal rays of the two light beams other than the light beam that is normal incident on the liquid crystal display element travel while dispersing with respective angles of 2θ with respect to the normal-incident principal ray even after they have passed through the liquid crystal display element. This results in a problem that an expensive projection lens with a large diameter is required in order to catch all the light beams and to project them onto the screen. However, in the present embodiment, the second micro-lens array 6 is installed in order to reduce the expansion of the released light beams, as illustrated in FIG. 1(a). Further, the focal distance of the first micro-lens array 5 is set so as to satisfy the equation (4). As a result, the focal points of the light beams that are released from the first micro-lens array 5 are located in the vicinity of the light-releasing side of the second micro-lens array 6.

The second micro-lens array 6, which is disposed as described above, functions in the same manner as the field lens, and makes it possible to reduce the expansion of the angle of light released from the liquid crystal display element 7. Therefore, all the light beams are utilized effectively, and it is not necessary to use a projection lens with a large diameter. As a result, the efficiency of light utilization can be improved, and it is possible to obtain color images having better white balance. Further, since an expensive lens with a large diameter, which causes high costs, is no longer necessary, it becomes possible to reduce the costs of the projection-type color liquid crystal display as a whole.

Additionally, the second micro-lens array 6 may be formed on the second glass substrate 16 that is installed on the light-releasing side of the liquid crystal display element 7; this arrangement provides the same effects as the present embodiment.

[EMBODIMENT 2]

Referring to FIGS. 2 and 3, the following description will discuss another embodiment of the present invention. Here, for convenience of explanation, those members that have the same functions and that are described in the aforementioned embodiment are indicated by the same reference numerals and the description thereof is omitted.

In the projection-type color liquid crystal display of the present embodiment, an explanation will be given by exemplifying an active-matrix-type liquid crystal display element in the twisted nematic mode (TN), in place of the simple-matrix-type liquid crystal display element that was used in the embodiment 1. This active-matrix-type liquid crystal display element, which has a well-known structure, is driven dynamically by the use of amorphous-silicon semiconductor thin-film transistors that switch rectangular pixels arranged in the form of matrix.

Figure 3B:
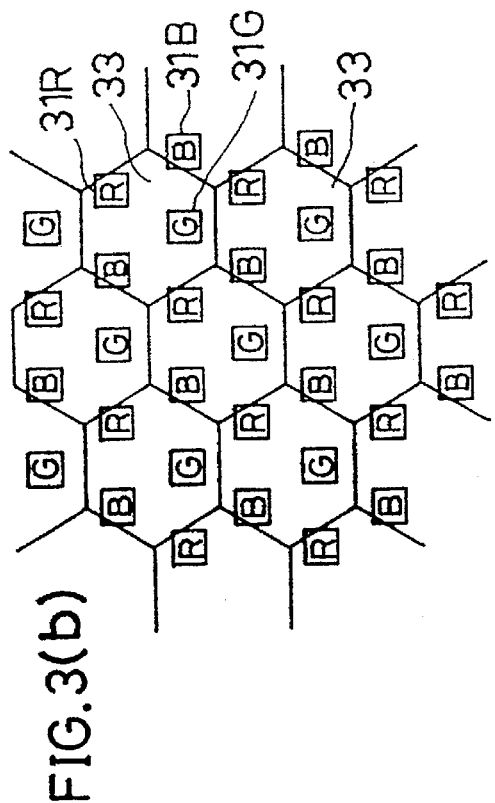
FIGS. 3(a) through 3(d) are schematic illustrations, each showing the shape of micro-lenses and the corresponding pixels that are installed in a projection-type color liquid crystal display in another embodiment of the present invention.
Figure 3D:
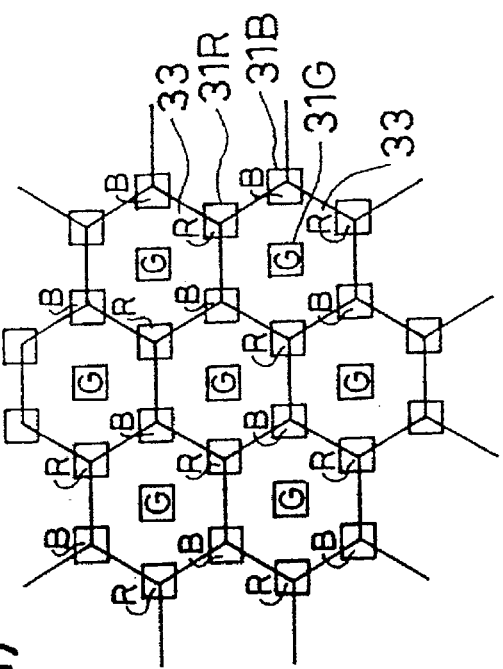
Figure 3A:
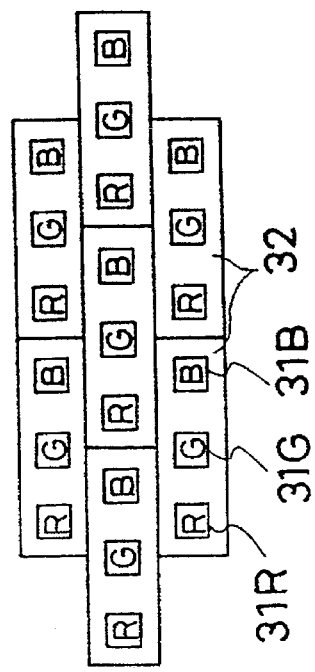

As illustrated in FIG. 3(a), in the active-matrix-type liquid crystal display element of the present embodiment, the pixels are arranged into a delta-shaped array. The pitch of the pixels is 100 μm in both the longitudinal and lateral directions; the size of the aperture of each pixel is 50 μm in length×70 μm in width; the number of the pixels is 450 in length×600 in width; and the ratio of the pixel apertures is 35%. In FIG. 3(a), pixel electrodes 31R, 31G and 31B, which deal with the respective pixels, are arranged into a delta array, and portions which do not contain the pixel electrodes 31R, 31G and 31B represent a light-shielding layer.

In the projection-type color liquid crystal display of the present embodiment, in addition to the above-mentioned active-matrix-type liquid crystal display element, the same arrangement as that of the embodiment 1, shown in FIG. 2, is provided, and the positional relationships between the respective components are set in the same manner as the aforementioned embodiment 1; however, the orientation of the arc of the metal halide lamp used as the white-light source 1 is set to be parallel to the surface of the drawing.

Moreover, in the case when the pixels are arranged in such a delta array, it is not appropriate to adopt lenthicular lenses as the first and second micro-lens arrays. In this case, as shown in FIG. 3(a), a micro-lens array, which is formed by laying micro-lenses 32 having a brick-like shape, is used. Here, the shape of each micro-lens does not need to be analogous to the shape of a set of the corresponding pixels. Therefore, instead of this array, it is possible to adopt a honey-comb-shaped micro-lens array which is formed by closely arranging hexagonal micro-lenses 33, that is, by fusing the circumferences of spherical lenses and bonding them to one another, as illustrated in FIGS. 3(b) and 3(c).

Figure 3C:
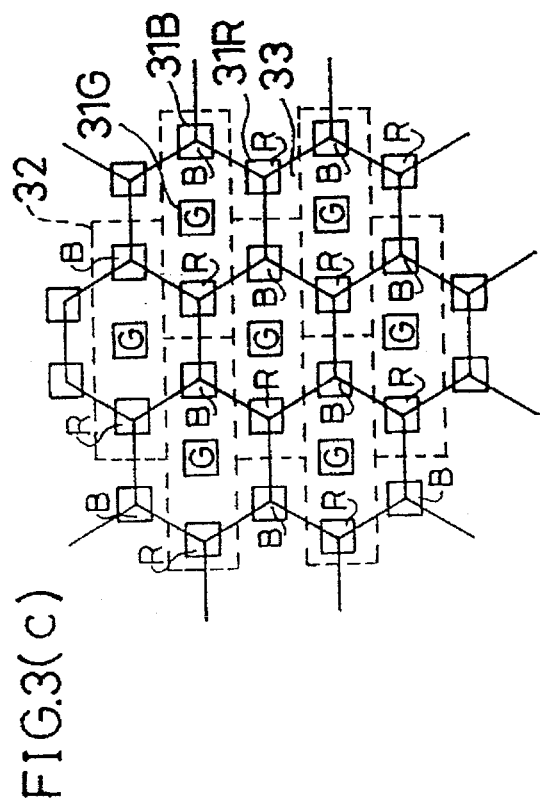

In the cases shown in FIGS. 3(a) and 3(c), the pixel array and the micro-lens array are set with a relative positional relationship so that converged-light spots of three primary colors, which are converged by one micro-lens 32 (or 33), are respectively coincident with the respective three pixel electrodes 31R, 31G and 31B that are aligned in a lateral row. In the case shown in FIG. 3(b), on the other hand, the pixel array and the micro-lens array are set with another positional relationship so that converged-light spots of three primary colors, which are converged by one micro-lens 33, are coincident with the respective three pixel electrodes 31R, 31G and 31B that are arranged to form the apexes of a triangle.

In the latter case wherein one set of the converged-light spots are illuminated in the form of a triangle, the dichroic mirrors 4R, 4G and 4B are arranged so that the directions of their face normals are tilted with respect to the surface of the drawing of FIG. 2. This arrangement makes it possible to reduce the angles made between the incident light beams of the respective colors and the optical axis of the micro-lens, thereby reducing the aberration of the micro-lens array.

As to the first and second lens arrays, the array shown in FIG. 3(a) or FIG. 3(b) may be applied to both of the arrays so that they have the same shape; or the honey-comb-shaped micro-lens array and the micro-lens array formed by laying the brick-shaped micro-lenses may be combinedly used as these lens arrays, as shown in FIG. 3(c). Here, in FIG. 3(c), the honey-comb-shaped array is used as the first micro-lens array 5 that is installed on the light-source side, and the brick-wall-shaped array is used as the second micro-lens array 6 that is installed on the liquid-crystal-display-element side. Additionally, it is not preferable to reverse the positions of the first micro-lens array 5 and the second micro-lens array 6 in this case, because the converged-light spots overlap the border of the second micro-lens array 6. As to the manufacturing method of the micro-lens array, the ion-exchanging method, for example, disclosed in Japanese Laid-Open Patent Publication 248125/1991(Tokukaihei 3-248125), may be adopted.

The following description will discuss the case where the brick-wall-shaped array, shown in FIG. 3(a), is applied to both the first and second micro-lens arrays 5 and 6.

In the case when the projection-type color liquid crystal display has the arrangement as shown in FIG. 2, the light beam of green, reflected by the dichroic mirror 4G, is illuminated onto the first micro-lens array 5 perpendicularly (in parallel with the surface of the drawing), and is focused on the second micro-lens array 6.

The light beam of green, which does not change in the second micro-lens array 6, passes through a green pixel that is disposed on the optical axis of each micro-lens while dispersing with an angle corresponding to the NA (Numerical Aperture) of the micro-lenses constituting the first micro-lens array 5. The light beams of red and blue, which are illuminated in respective directions that tilt to the right and left by 8° with respect to the light beam of green, are focused on the intersections between the perpendiculars of red and blue pixels and the second micro-lens array 6 by the first micro-lens array 5. The light beams of red and blue are changed in the travelling directions of their principal rays by the second micro-lens array 6 such that they are directed in the direction perpendicular to the liquid crystal display element 7 and pass through the respective pixels of red and blue. The size of the converged-light spots on the pixel electrodes is calculated in the same manner as the embodiment 1 to become 60 μm×26.4 μm; this falls within the pixel aperture.

Additionally, in the case of using the delta-shaped array of pixels as well as using rectangular-shaped micro-lenses as the first micro-lens array 5 as is adopted in the present embodiment, it is preferable to arrange the rectangular-shaped micro-lenses so that they also have the light-converging capability in the up and down directions of the screen and perform a two-dimensional light-converging operation. This arrangement makes it possible to improve illuminance on the screen.

Moreover, the principal rays of the respective light beams are made to become parallel to each other by the second micro-lens array 6, and their releasing directions are made to become perpendicular to the liquid crystal display element; therefore, in the same manner as the embodiment 1, it becomes possible to reduce the costs without adversely affecting the efficiency of light utilization.

Here, in the embodiments 1 and 2, in the case of using illuminating light which has poor light expand angle or having stray light that is incident on the liquid crystal display element 7, a decline in the display contrast or a decline in the color purity might be caused. Therefore, it is preferable to adopt an arrangement on demand, wherein the white light from the white-light source 1 is temporarily converged into a spot of light by a condenser lens, and unnecessary light is then removed by using a slit, a pin hole, or other members. Further, in the case of adopting a light-converging system wherein ellipsoidal mirrors and integrators are combined, the integrators are allowed to have a function to regulate the light expand angle of the illuminating light. Furthermore, instead of dividing the white light from the white-light source 1, another arrangement may be adopted, wherein three light sources for projecting light beams of the three primary colors are used and the light beams having the respective colors are illuminated onto the liquid crystal display element in directions different from one another.

[EMBODIMENT 3]

Referring to FIGS. 4 through 7, the following description will discuss still another embodiment of the present invention. Here, for convenience of explanation, those members that have the same functions and that are described in the aforementioned embodiments by reference to their drawings are indicated by the same reference numerals and the description thereof is omitted.

Figure 4:
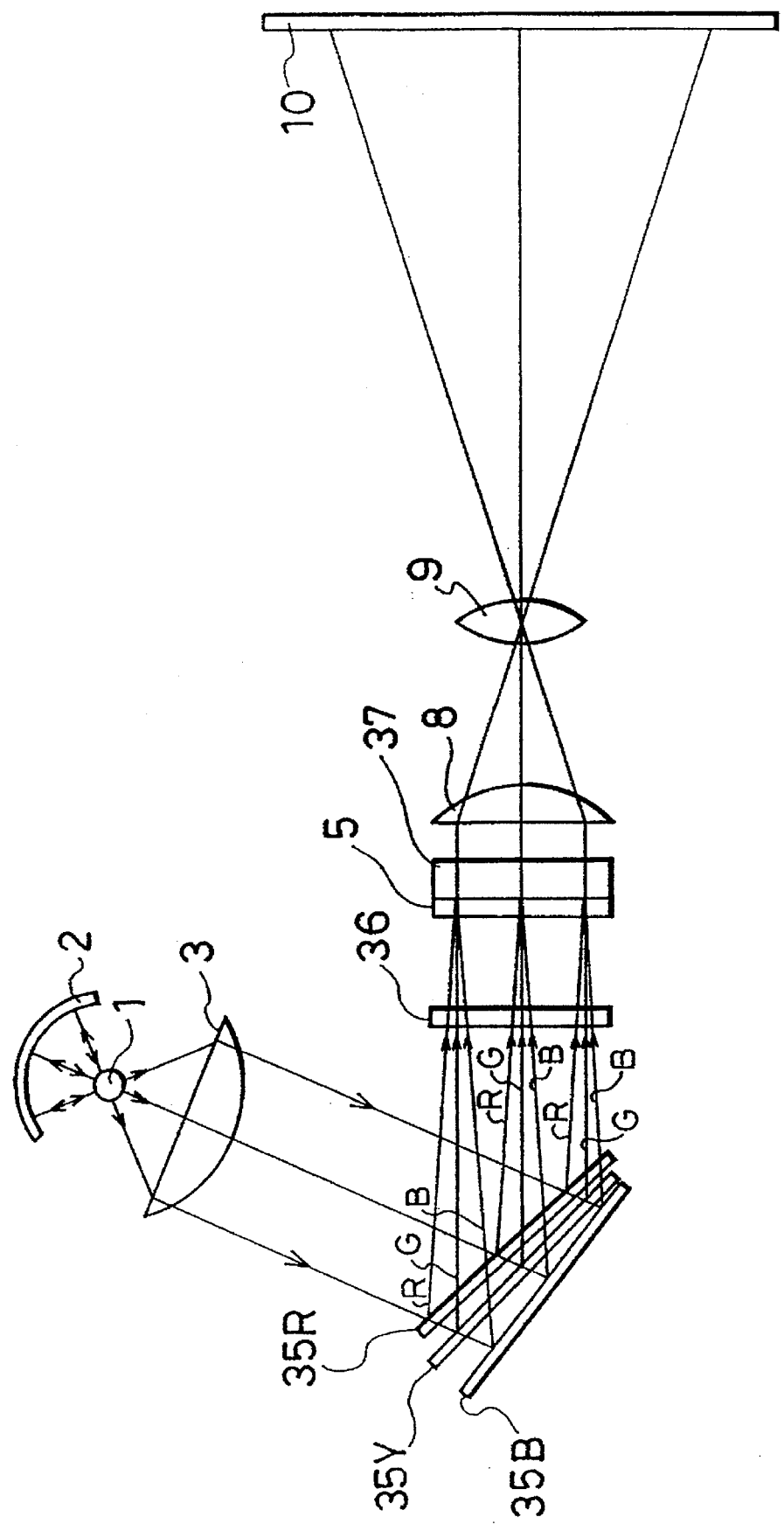
FIG. 4 is a schematic illustration showing a construction of a projection-type color liquid crystal display in still another embodiment of the present invention.

FIG. 4 is a schematic illustration of a projection-type color liquid crystal display in accordance with the present embodiment. The projection-type color liquid crystal display is provided with a white-light source 1, a spherical mirror 2 and a condenser lens 3 in the same manner as the embodiment 1.

In front of the condenser lens 3, are disposed dichroic mirrors 35R, 35Y and 35B of three types which divide white light from the white-light source 1 into three beams. These dichroic mirrors 35R, 35Y and 35B are aligned on the optical axis of the white light released from the white-light source 1 in this order with respectively different angles. The dichroic mirrors 35R, 35Y and 35B have such characteristics that they selectively reflect light beams of respective wavelength ranges corresponding to red, red and green, and blue, and transmit the other light beams.

Here, the blue, green and red wavelength ranges represent wavelength ranges of about 400 to 495 nm, about 495 to 575 nm, and about 575 to 700 nm respectively. If all the light covering these wavelength ranges is utilized, the illuminance of the screen is increased; however, the purity of each primary color is lowered. For this reason, if a stress is laid on the purity of color, it is preferable to eliminate light located in the vicinity of 495 nm as well as of 575 nm. This arrangement divides the white light into the respective light beams of red, green and blue.

Normally, in order to separate the light beam of green, a green-reflective dichroic mirror is used in the same manner as the embodiment 1. However, if the dichroic mirror 35R for red-reflection use, which is located at the closest position to the white-light source 1 among the three dichroic mirrors 35R, 35Y and 35B, has a high wavelength selectivity (that is, in the case when its transmittance is close to 0% in the red-wavelength range, it is close to 100% in the other wavelength ranges, and it abruptly changes at borders between the wavelength ranges), it is preferable to use a yellow-reflective (red and green) dichroic mirror in place of the green-reflective dichroic mirror, in order to obtain desired effects.

The advantages of using the yellow-reflective dichroic mirror 35Y are:

(1) that since the yellow-reflective dichroic mirror requires fewer number of thin-film layers compared to the green-reflective dichroic mirror, it is easily manufactured and its manufacturing cost is inexpensive; and (2) that although it is difficult to manufacture a green-reflective dichroic mirror having high performances in its spectral characteristics because it is a band-cut filter, it is possible to manufacture a yellow-reflective dichroic mirror having a high wavelength selectivity because it is a low-pass filter.

It is possible to adopt the yellow-reflective dichroic mirror, on the assumption that the red-reflective dichroic mirror 35R has a high wavelength selectivity in green and red as described above. Here, in the case of the red-reflective dichroic mirror 35R on the assumption of natural-light incidence, it is difficult to make its rising width not more than 40 nm. Here, the rising width is referred to as the difference of wavelengths where its transmittance changes between 10% and 90%. In other words, the smaller the rising width, the more abruptly the transmittance changes at the border of wavelength ranges, that is, the higher the wavelength selectivity.

The reason why it is difficult to make the rising width not more than 40 nm is that the spectral characteristics of the dichroic mirror fail to conform to s-state polarization (light whose electric field oscillates in the direction perpendicular to the surface of the drawing) and p-state polarization (light whose electric field oscillates in the direction parallel to the surface of the drawing).

In other words, if the state of polarization is limited to either s-state polarization or p-state polarization, it is comparatively easy to design a dichroic mirror having the rising width of not more than 40 nm. For example, if the incident light is limited to s-state polarization component or p-state polarization component without using natural light (non-polarized), it is possible to reduce the rising width to around 20 nm even by the use of the number of layers in practical use.

Figure 5:
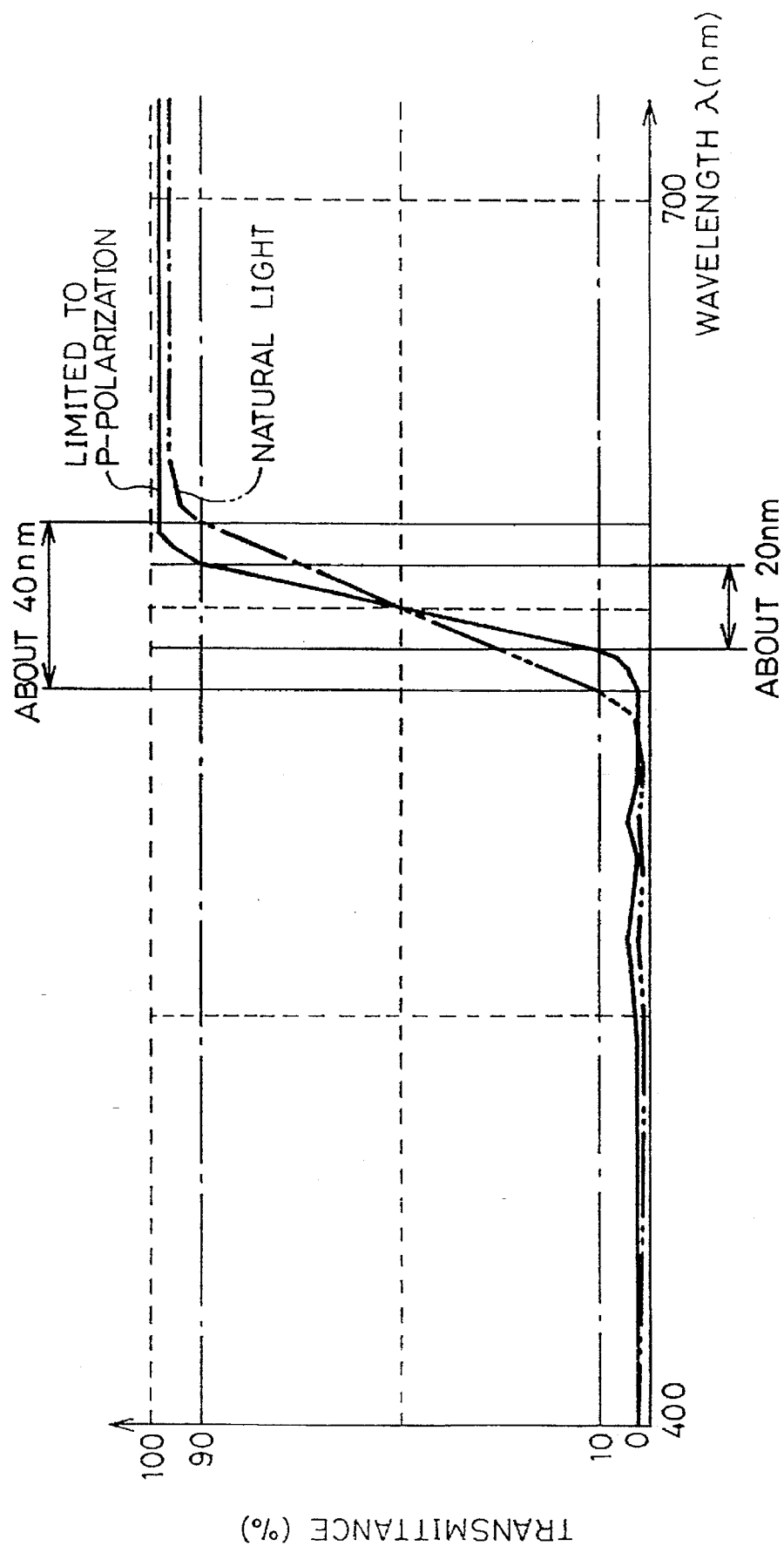
FIG. 5 is a graph showing spectral characteristics of a dichroic mirror for red-reflection use that is installed in the projection-type liquid crystal display of FIG. 4 upon incidence of natural light as well as upon incidence of p-polarized light component.

FIG. 5 shows the above-mentioned states, wherein a solid line indicates the transmittance characteristics to p-state polarization component in a red-reflective dichroic mirror that is designed so as to permit only the incidence of p-state polarization component and an alternate long and two short dashes line indicates the transmittance characteristics to natural light in a red-reflective dichroic mirror that is designed on the assumption of the natural-light incidence.

According to this figure, it is clearly shown that the dichroic mirror having a limited polarization state provides a higher wavelength selectivity than the dichroic mirror that is designed for non-polarized light (natural light). Additionally, in the figure, the polarization state is limited to p-state polarization. However, the dichroic mirror 35R may be designed so as to permit only the incidence of s-state polarization component; this case also provides the same spectral characteristics as the case of limited use of p-state polarization component. Moreover, as to dichroic mirrors for reflecting the other colors, their wavelength selectivity is improved by limiting their polarization state, in the same manner as shown in the red-reflective dichroic mirror 35R.

The following description will exemplify a case where the dichroic mirrors 35R, 35Y and 35B are designed for the limited use of p-state polarization component. Additionally, the limited use of p-state polarization component makes the quantity of light fall to half that in the case of using natural light. However, even in the case of liquid crystal display elements wherein polarization is utilized such as seen in the TN and STN modes, half the total quantity of light is normally absorbed or reflected by polarizing plates when light is incident on the liquid crystal display element.

Therefore, even when the dichroic mirrors 35R, 35Y and 35B are designed for limited use of polarization component, the quantity of light at the time of release from the projection lens is kept the same, as will be described later.

Figure 6:
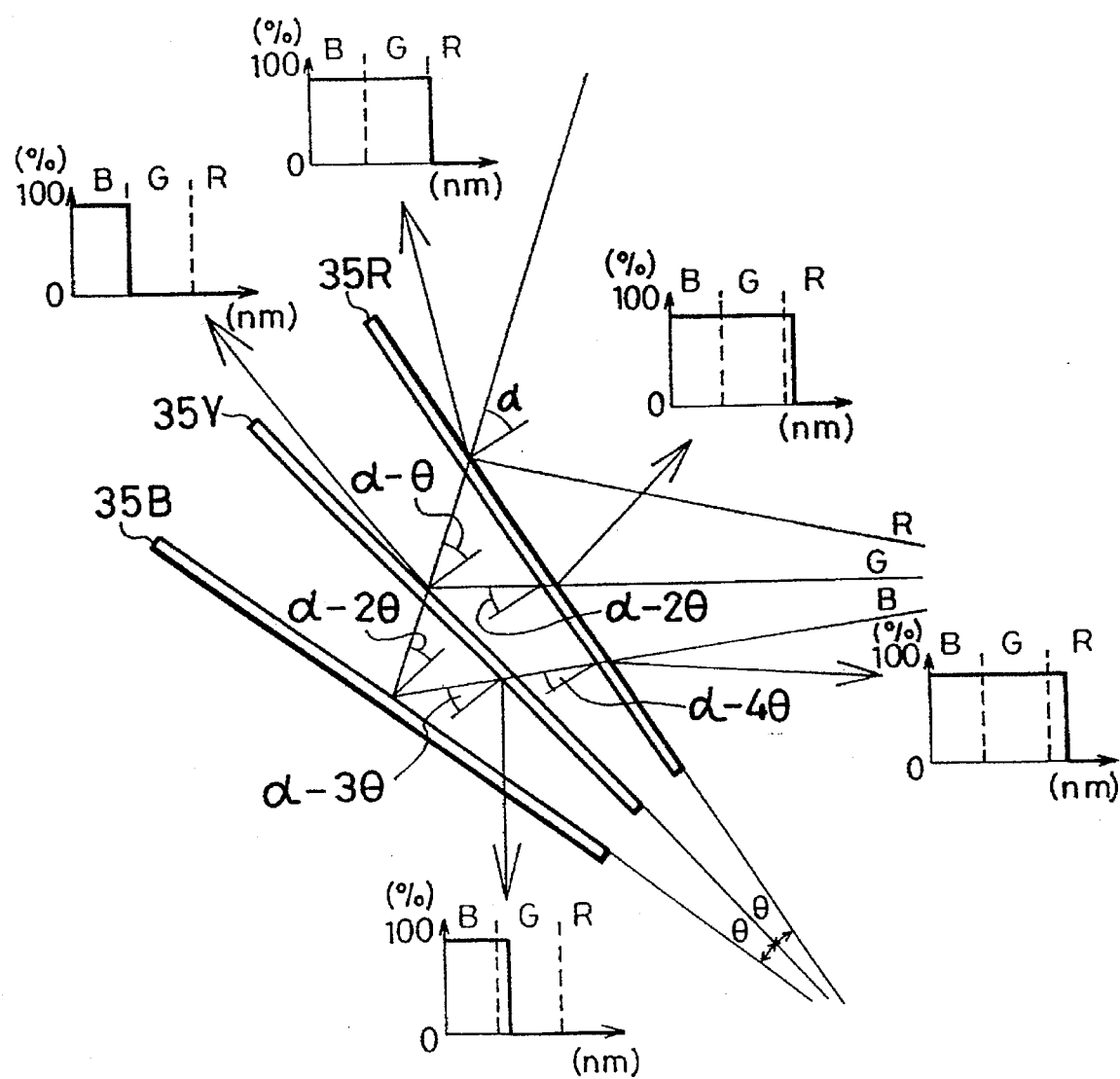
FIG. 6 is a schematic illustration showing arrangements of the dichroic mirrors installed in the projection-type color liquid crystal display of FIG. 4 and changes in spectral characteristics of each dichroic mirror that occur in response to changes in the incident angle of a light beam.

Referring to FIG. 6, the following description will discuss the division of light into respective colors that is made by the dichroic mirrors 35R, 35Y and 35B that are designed as described above. In the drawing, the designed incident angles of the dichroic mirrors 35R, 35Y and 35B are $\alpha$, $\alpha-\theta$, and $\alpha-2\theta$ respectively, and $\alpha$ is set to, for example, around 30° in the same manner as the aforementioned embodiment 1. Here, $\theta$ is found from the pixel-array pitch P, which will be described later, of the liquid crystal display element 37 and the focal distance $f\mu$ of the micro-lens array 5, in the same manner as described in the aforementioned embodiment 1. Moreover, the spectral characteristics of the dichroic mirrors 35R, 35Y and 35B change slightly depending on the incident angle of light. FIG. 6 also carries graphs showing outlines of the respective spectral characteristics that depend on the incident angle of light. Here, in each graph, the vertical axis indicates the transmittance and the horizontal axis indicates the wavelength.

When a light beam from the white-light source 1 is incident on the dichroic mirror 35R at an incident angle of $\alpha$, the spectral characteristics of the dichroic mirror 35R with respect to this incident angle are such that its transmittance to a red light beam is virtually 0%, and its transmittance to green and blue light beams is virtually 100%. Therefore, the red light beam is reflected by the dichroic mirror 35R, while the green and blue light beams, after passing through the dichroic mirror 35R, are incident on the dichroic mirror 35Y at an incident angle of $\alpha-\theta$. The spectral characteristics of the dichroic mirror 35Y with respect to this incident angle are such that its transmittance to the green light beam is virtually 0%, and its transmittance to the blue light beam is virtually 100%. Therefore, the green light beam is reflected by the dichroic mirror 35Y, and is again incident on the dichroic mirror 35R. At this time, the incident angle of the green light beam with respect to the dichroic mirror 35R is reduced by $2\theta$ compared with the designed incident angle $\alpha$.

These changes in the incident angle make the spectral characteristics of the dichroic mirror 35R shift toward the long-wavelength side (actually, not only a shift, but also ripples occur in transmitted-light wavelength range as well as in reflected-light wavelength range, but these ripples are smaller than those of non-polarized light); however, its transmittance to the green light beam is nearly 100%. Therefore, almost all the green light beam that has been reflected by the dichroic mirror 35Y passes through the dichroic mirror 35R. In other words, stray light, such as caused by the green light beam in the aforementioned conventional projection-type color liquid crystal display, is hardly seen in the projection-type color liquid crystal display in the present embodiment.

Further, the blue light beam, which has passed through the dichroic mirror 35Y, is reflected by the dichroic mirror 35B, and the reflected blue light beam is incident on the dichroic mirrors 35Y and 35R at angles that are smaller than the designed incident angle by $2\theta$ and $4\theta$ respectively. With respect to these incident angles, the spectral characteristics of the dichroic mirrors 35R and 35Y are shifted toward the long-wavelength side respectively (here, ripples also occur in the same manner as the dichroic mirror 35R). However, as with the green light beam, in both of the dichroic mirrors 35R and 35Y, their transmittance to the blue light beam at the above-mentioned incident angles is nearly 100%. Therefore, almost all the blue light beam passes through the dichroic mirrors 35R and 35Y. Thus, stray light, such as caused by the light beam reflected by the third dichroic mirror in the aforementioned conventional projection-type color liquid crystal display, is reduced to a great degree in the projection-type color liquid crystal display in the present embodiment.

As described above, the present embodiment has arrangements wherein the yellow-reflective dichroic mirror 35Y is used in place of the conventional green-reflective dichroic mirror in order to divide the white beam into the three primary colors; and the dichroic mirrors 35R, 35Y and 35B are designed so as to permit only the incidence of p-state polarization component, and are disposed as described earlier. These arrangements make it possible for the dichroic mirrors 35R, 35Y and 35B to improve their color-separation performance in the light beams as well as to improve the purity of the colors, red, green and blue, by reducing stray light.

Additionally, the present embodiment has exemplified the case where the white light is divided into the three primary colors by using the dichroic mirrors 35R, 35Y and 35B. However, the present invention may be also applied to a case where it is divided into four or more colors: in this case, the present invention may be applied to, for example, graphic displays.

Meanwhile, as described earlier, p-state polarization component oscillates in the direction perpendicular to the advancing direction of light, that is, in the direction parallel to the surface of FIG. 4, while the transmitting axis of the polarizing plate on the light-incident side in the liquid crystal display element 37 is normally disposed in parallel with, or perpendicular to the rubbing direction of the liquid crystal layer. Here, the transmitting axis of the polarizing plate is set with an angle of 45° diagonally from the display surface of the liquid crystal display element in order to make the optimum viewing direction of the liquid crystal display element 37 set in the 12 o'clock direction or the 6 o'clock direction; thus, the direction of the transmitting axis is not in conformity with that of p-state polarization component in most cases.

In order to solve this problem, in the present embodiment, a half-wave plate (polarization-plane rotator) 36 is disposed between the dichroic mirrors 35R, 35Y and 35B and the liquid crystal display element 37, as illustrated in FIG. 4. The half-wave plate 36, which is made of a material having a double-refracting property and is an optical element having an optical anisotropy, has a function for rotating the direction of the polarization axis of the incident light to a direction that is symmetric with respect to the optical axis (of the half-wave plate 36). For this reason, the half-wave plate 36 is disposed so that the optical axis of the half-wave plate 36 bisects the angle that is made by the polarization axis of the p-state components of the dichroic mirrors 35R.35Y.35B and the transmitting axis of the polarizing plate. When the light beams of the respective colors, reflected by the dichroic mirrors 35R, 35Y and 35B, pass through this half-wave plate 36, the p-state polarization components of the respective light beams are allowed to rotate, and become coincident with the transmitting axis of the polarizing plate on the light-incident side of the liquid crystal display element 37. Additionally, in the present embodiment, although natural light is incident on the dichroic mirrors 35R, 35Y and 35B, the polarization components to be utilized are determined by the polarizing plate on the light-incident side; therefore, it is not necessary to newly add polarizing plates on the light-incident side of the dichroic mirrors 35R, 35Y and 35B.

Further, the same is true in the case of using s-state polarization component; therefore, when the dichroic mirrors 35R, 35Y and 35B are designed for the limited use of s-state polarization component, a half-wave plate for rotating the s-state polarization components to the transmitting axis of the polarizing plate is used. Additionally, besides the half-wave plate, liquid crystal and other materials may be adopted as the polarization-axis changing means.

Figure 7:
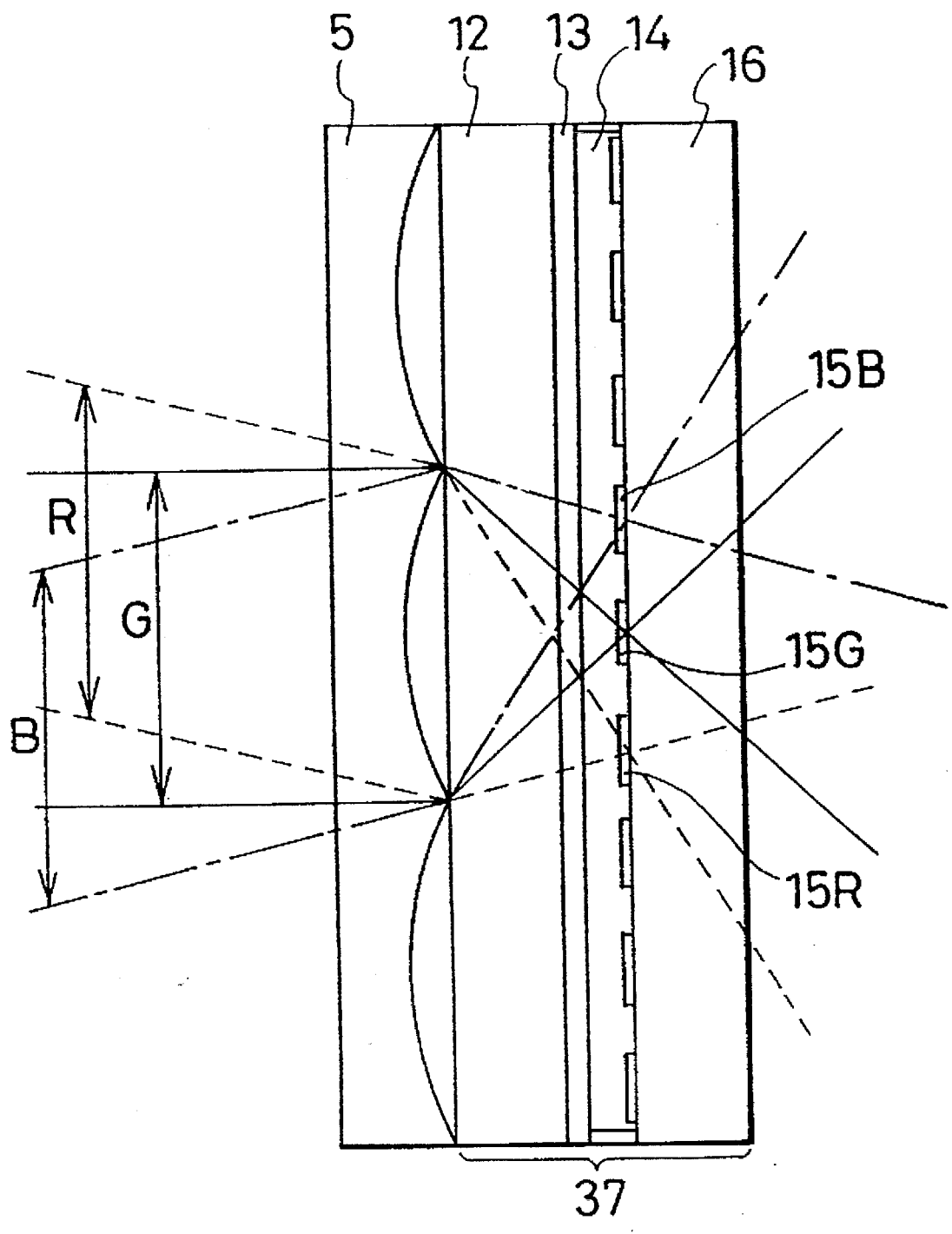
FIG. 7 is a cross-sectional view showing liquid crystal elements and a micro-lens array that are installed in the projection-type color liquid crystal display of FIG. 4.

The liquid crystal display element 37 has the same arrangement as the simple-matrix-type liquid crystal display element 7 that is used in the aforementioned embodiment 1; however, in this embodiment, the micro-lens array 5 is installed only on the light-incident surface of the first glass substrate 12, as illustrated in FIG. 7. Here, the shape and other factors of the micro-lens array 5, the scanning electrodes 13 and the signal electrodes 15R, 15G and 15B formed on the respective glass substrates 12 and 16, and the liquid crystal layer 14 formed between the glass substrates 12 and 16 are the same as those of the liquid crystal display element 7 in the aforementioned embodiment 1. In FIG. 7, also, the polarizing plates, alignment films and other members, which constitute some components of the liquid crystal display element 37, are omitted.

The light beams of red, green and blue, which have passed through the half-wave plate 36, are incident on the micro-lens array 5 at respectively different angles. In the present embodiment, it is assumed that the light beam of green is normal incident on the micro-lens array 5 and that the light beams of red and blue have symmetrical angles with respect to the light beam of green. When the light beams of the respective colors are illuminated onto the micro-lens array 5 in the predetermined directions in this manner, the respective light beams are converged on the signal electrodes 15R, 15G and 15B in the form of lines with intervals of 300 µm corresponding to the pitch of the lenticular lenses that constitute the micro-lens array 5. The width W of the converged-light line measures 26.4 µm in accordance with the equation (3) in the embodiment 1, and falls within the stripe-shaped signal electrodes 15R, 15G and 15B.

Further, as to the relative angles of the positions of the dichroic mirrors 35R, 35Y and 35B, the setting is also made in accordance with the equation (5) in the same manner as the embodiment 1; thus, the converged-light lines of red, green and blue are formed on the signal electrodes 15R, 15G and 15B with respect to the respective colors. In other words, the beams of the respective three primary colors, which have directions respectively different by 8°, are illuminated onto the micro-lens array 5, and the converged-light lines of the respective three primary colors are thus formed on the signal electrodes that are adjacent with successive intervals of 100 µm.

Moreover, as illustrated in FIG. 4, the projection-type color liquid crystal display of the present embodiment is provided with: a field lens 8, a projection lens 9, and a screen 10 in the same manner as the embodiment 1. The light beams of the three primary colors, which have been modulated by the liquid crystal display element 37, are illuminated onto the screen 10 by the field lens 8 and the projection lens 9, thereby allowing color images to be displayed.

As described above, the projection-type color liquid crystal display of the present embodiment makes it possible to reduce stray light that occurs when the light beams are separated into the respective colors. Thus, the purity of each color is improved, thereby achieving high-quality full-color image display.

[EMBODIMENT 4]

Referring to FIGS. 3 and 4, the following description will discuss still another embodiment of the present invention.

Although the projection-type color liquid crystal display of the present invention has a construction as shown in FIG. 4 virtually in the same manner as the embodiment 3, it is provided with not a simple-matrix-type liquid crystal display element, but an active-matrix-type liquid crystal display element, as the liquid crystal display element 37. The active-matrix-type liquid crystal display element has the same pixel-array pitch, number of electrodes, and other members as the embodiment 2.

In the present embodiment, the orientation of the arc in the white-light source 1 is disposed in parallel with the surface of FIG. 4. The pixel array in the liquid crystal display element 37 is a delta-array in the same manner as the embodiment 2. As to the micro-lens array 5 installed in the liquid crystal display element 37, the shape of each micro-lens does not need to be analogous to the shape of a set of the corresponding pixels; therefore, the shapes as shown in FIGS. 3($a$), 3($b$) and 3($d$) may be adopted. However, in the case of using the micro-lens array 5 shown in FIG. 3($b$) consisting of hexagonal micro-lenses 33, it is necessary to arrange the dichroic mirrors 35R, 35Y and 35B so that the directions of their face normals are tilted with respect to the surface of FIG. 4.

As to the light-beam divider, besides the red-reflective and blue-reflective dichroic mirrors 35R and 35B, the yellow-reflective dichroic mirror 35Y is used in place of the green-reflective dichroic mirror, in the same manner as the embodiment 3. These dichroic mirrors 35R, 35Y and 35B are disposed in the same order of arrangement as the embodiment 3 so that they are designed for the limited use of p-state polarization component. Moreover, the half-wave plate 36 is disposed between the dichroic mirrors 35R, 35Y and 35B and the micro-lens array 5 in such a manner that the p-state polarization component is rotated to be coincident with the transmitting axis of the polarizing plate on the light-incident side of the liquid crystal display element 37.

In the above-mentioned embodiment, light emitted from the white-light source is divided into light beams of the respective colors by the dichroic mirrors 35R, 35Y and 35B. These light beams pass through the half-wave plate 36, and are incident on the micro-lens array 5 in accordance with the relative angles at which the dichroic mirrors 35R, 35Y and 35B are disposed. The light beams, which have been incident on the liquid crystal display element 37 from the micro-lens array 5, are modulated by the liquid crystal display element 37, and illuminated onto the screen 10 by the field lens 8 and the projection lens 9.

Similarly, in the case of using the active-matrix-type liquid crystal display element, it is possible to obtain the same functions and effects as the embodiment 3, by adopting the dichroic mirrors 35R, 35Y and 35B that are designed for the limited use of the polarization state in addition to the half-wave plate 36 in the same manner as the embodiment 3; thus, the purity of each color is improved, thereby achieving high-quality full-color display.

Additionally, the present embodiment has exemplified the case where the dichroic mirrors that are designed for the limited use of p-state polarization component are adopted. However, the same effects are obtained in the case of the limited use of s-state polarization component.

[EMBODIMENT 5]

Figure 8:
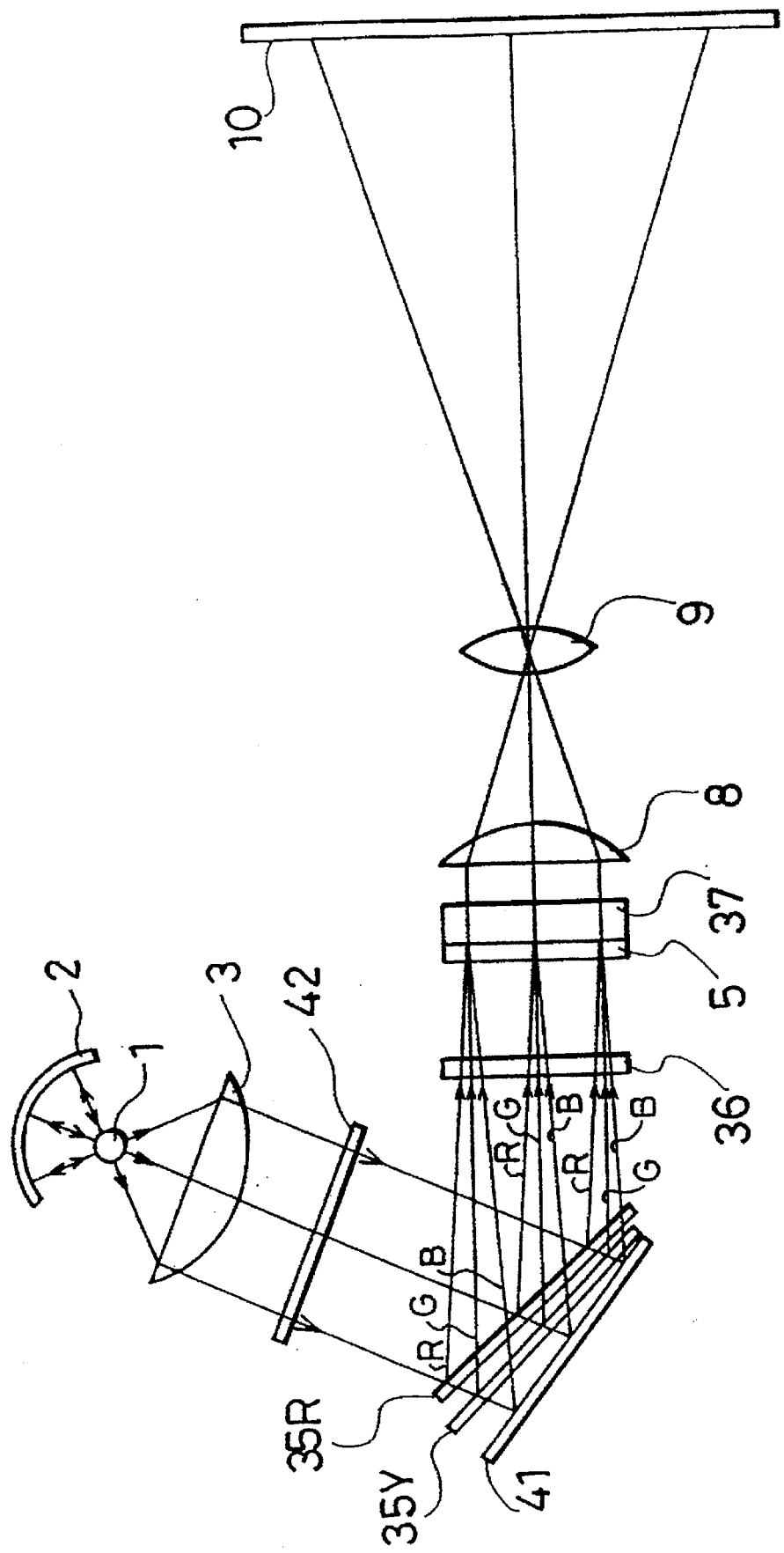
FIG. 8 is a schematic illustration showing a construction of a projection-type color liquid crystal display in still another embodiment of the present invention.
Figure 9:
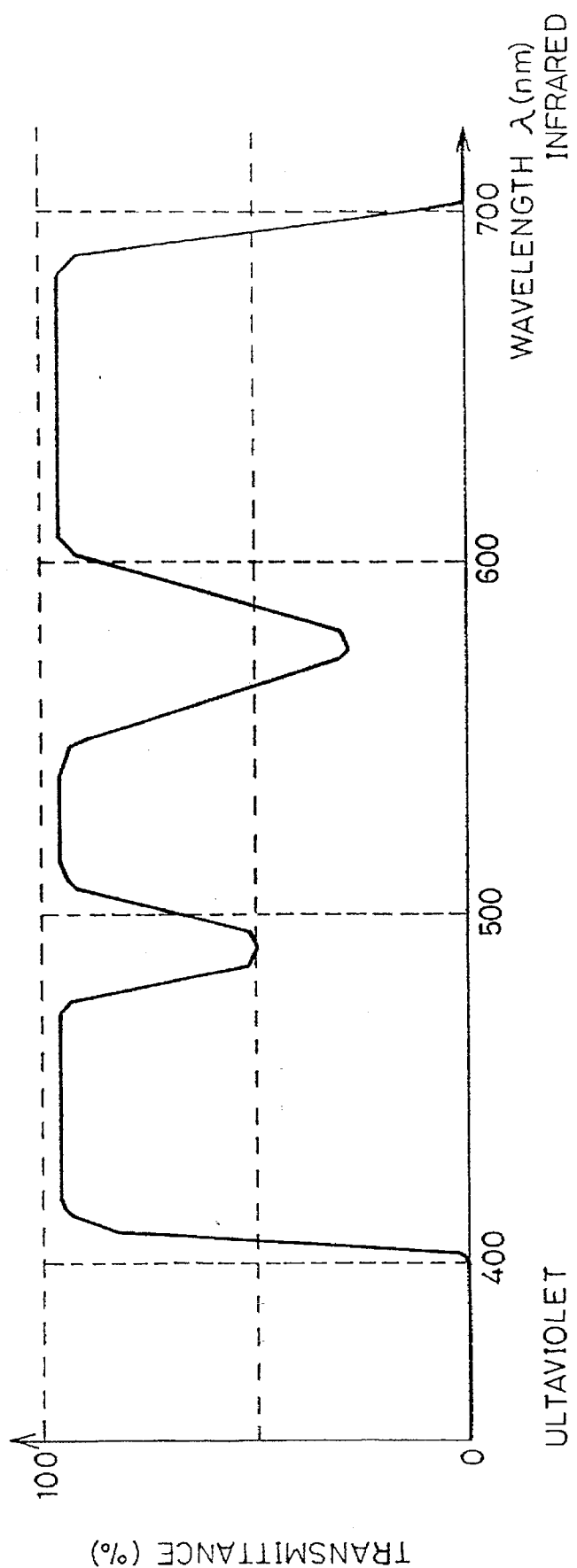
FIG. 9 is a graph showing spectral characteristics of trimming filters that are installed in the projection-type color liquid crystal display of FIG. 8.

Referring to FIGS. 8 and 9, the following description will discuss still another embodiment of the present invention. Here, for convenience of explanation, those members that have the same functions and that are shown in the drawings of the aforementioned embodiments are indicated by the same reference numerals and the description thereof is omitted.

In the examples of the aforementioned embodiments 3 and 4, the dichroic mirrors 35R, 35Y and 35B are disposed as the light-beam divider from the light-source side in this order. Here, the present embodiment exemplifies a case where a full-reflective mirror, which reflects all the wavelength ranges of light, is used in place of the third dichroic mirror 35B that reflects the wavelength range of light corresponding to blue. This full-reflective mirror is formed by evaporating a metal film over a glass substrate by the use of the well-known technology.

As illustrated in FIG. 8, the projection-type color liquid crystal display of the present embodiment is different from that of the embodiment 3 in its light-beam divider means consisting of the dichroic mirrors 35R and 35Y and the full-reflective mirror 41 and the neighboring construction thereof. Further, the liquid crystal display element 37 may be either of the simple-matrix type, used in the embodiment 1, or of the active-matrix type, used in the embodiment 2.

A metal halide lamp is used as the white-light source 1 in the same manner as the embodiment 1; however, the orientation of the arc is disposed perpendicularly to the surface of the drawing in the case of the simple-matrix type, while it is disposed in parallel with the surface of the drawing in the case of the active-matrix type. White light beam, emitted from the white-light source 1, is shaped into parallel beams of light by the condenser lens 3, and the light beams are incident on the dichroic mirrors 35R and 35Y and the full-reflective mirror 41. Here, the dichroic mirror 35R reflects the light beam of red color, and the dichroic mirror 35Y reflects the light beam of yellow (red and green) color.

In the present embodiment also, the state of polarization is limited to p-state polarization; therefore, the wavelength selectivity of the dichroic mirrors 35R and 35Y is high upon separation of colors. Thus, almost all the the light beams, except that of the blue wavelength range, are reflected by the dichroic mirrors 35R and 35Y that reflect red and yellow light respectively, and the remaining light beam, after passing through the yellow- reflective dichroic mirror 35Y, is virtually only the light beam of the blue wavelength range. Moreover, in the same manner as the embodiment 3, the half-wave plate 36 is disposed between the micro-lens array 5 and the dichroic mirrors 35R.35R such that the axis direction of the p-state polarization component is rotated to be coincident with the transmitting axis of the polarizing plate on the light-incident side of the liquid crystal display element 37.

In this state, it is substantially possible to extract only the blue wavelength range by the full-reflective mirror 41 without using the blue-reflective dichroic mirror as the third mirror. However, although the use of the full-reflective mirror 41 increases the efficiency of light utilization to nearly 100%, it causes poor purity in colors. That is, the purity in colors deteriorates because this arrangement utilizes light beams having wavelength ranges of 490 to 500 nm (corresponding to cyan) and 560 to 590 nm (corresponding yellow). For this reason, in the case of using a light source having continuous spectrums or a light source having bright-line spectrums in the vicinity of 490 to 500 mm or 560 to 590 nm as the white-light source 1, it is not avoidable to have poor purity in colors even if the light-beam divider having the above-mentioned arrangement is adopted so as to eliminate mixed colors by using the dichroic mirrors with improved characteristics. Furthermore, the full-reflective mirror 41 reflects light in all the wavelength ranges; therefore, in the case of using lamps having high light emission in the infrared range or in the ultraviolet range, the liquid crystal display element is adversely effected by the infrared rays or the ultraviolet rays.

In order to solve these problems, in the projection-type color liquid crystal display of the present embodiment, a trimming filter (corrector) 42 is installed between the condenser lens 3 and the dichroic mirror 35R. As shown in FIG. 9, this trimming filter 42 is designed to have such spectral characteristics that the transmittances of the wavelength ranges (that is, the ultraviolet range, the range from 490 to 500 nm, the range from 560 to 590 nm, and the infrared range) that cause the poor purity in colors are intentionally lowered. In particular, both of the transmittances of the range less than 400 nm corresponding to the ultraviolet range and the range not less than 700 nm corresponding to the infrared range are set to virtually 0%.

By using the trimming filter 42 having such characteristics, it becomes possible to obtain the three primary colors, each having high purity, even in the case of using the full-reflective mirror 41 in place of the blue-reflective dichroic mirror. Moreover, since the white balance of display images is virtually determined by the white-light source 1 and the trimming filter 42, it is possible to correct the white balance by the use of the trimming filter 42.

Furthermore, in the present embodiment also, the incident angles of the light beams of the respective colors are respectively set to 8° in the same manner as the embodiment 1; therefore, as described in the calculations in the embodiments 1 and 2, the converged-light spot of the micro-lens array 5 falls within the signal electrodes in the liquid crystal display element 37.

As described above, the state of polarization in the light beams is limited in order to increase the wavelength selectivity of the dichroic mirrors 35R and 35Y upon separation of colors, and the light beams in the wavelength ranges that cause poor purity in colors are eliminated by using the trimming filter 42. Therefore, even in the case when the full-reflective mirror 41 is used in order to obtain the light beam of blue, the mixed states of colors are reduced, and the purity in the three primary colors is improved. Further, it is possible to widen the color reproduction range and to obtain vivid images.

Additionally, the present embodiment has exemplified the case where the state of polarization in the light beams is limited to p-state polarization component. However, in the case of the limited use of s-state polarization component, the same effects are obtained by using the trimming filter 42 together with the full-reflective mirror 41 that is installed to obtain the light beam of blue.

[EMBODIMENT 6]

Figure 10:
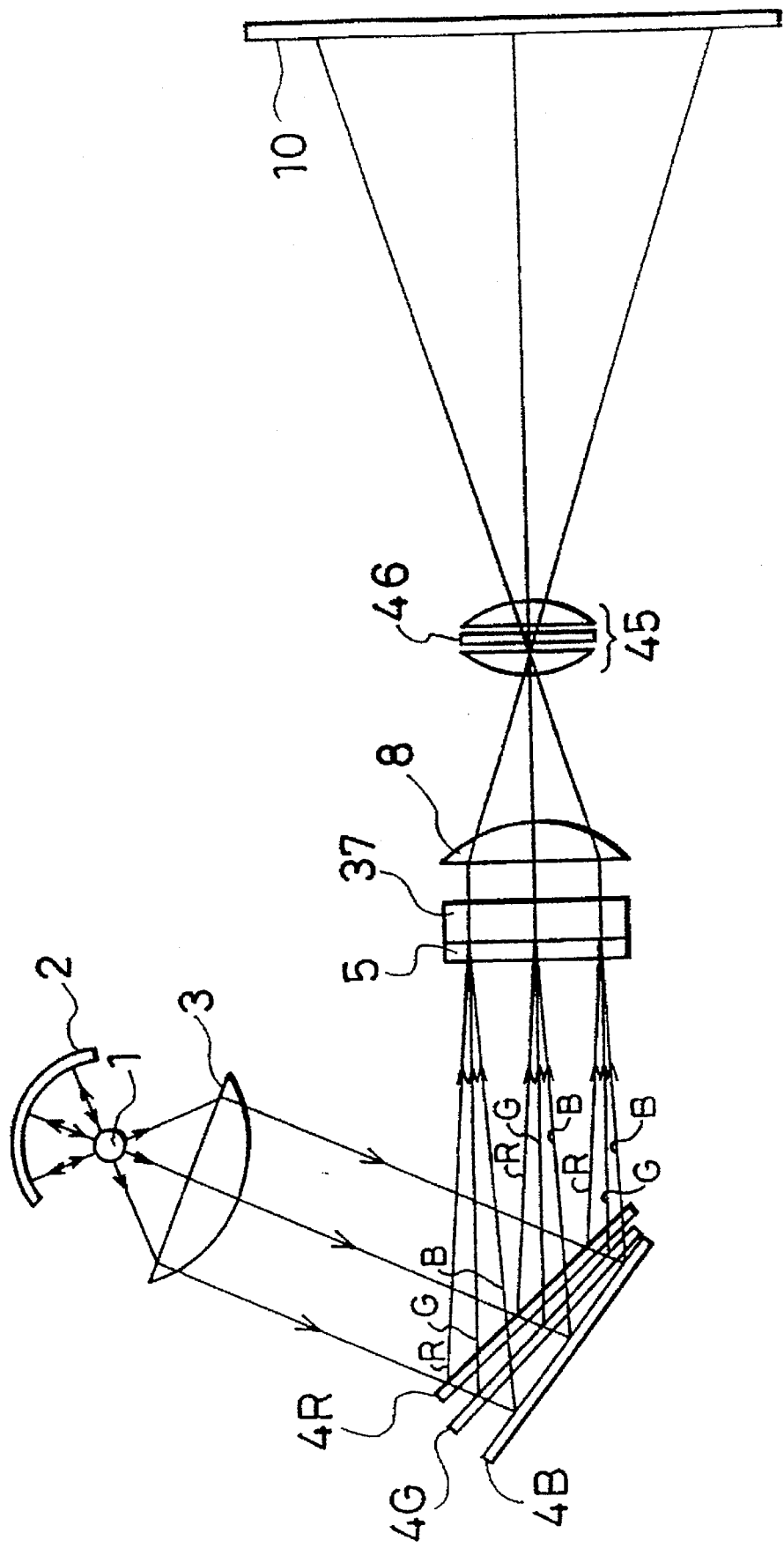
FIG. 10 is a schematic illustration showing a construction of a projection-type color liquid crystal display in still another embodiment of the present invention.

Referring to FIGS. 10 through 12, the following description will discuss still another embodiment of the present invention. Here, for convenience of explanation, those members that have the same functions and that are shown in the drawings of the aforementioned embodiments are indicated by the same reference numerals and the description thereof is omitted.

As illustrated in FIG. 10, the projection-type color liquid crystal display of the present embodiment is provided with a white-light source 1, a spherical mirror 2, a condenser lens 3 and dichroic mirrors 4R, 4G and 4B, in the same manner as the embodiment 1. White light, emitted from the white-light source 1, is shaped into parallel beams of light by the condenser lens 3, and the parallel beams are divided into light beams of the respective colors of red, green and blue by the dichroic mirrors 4R, 4G and 4B. The relative angle θ of the dichroic mirrors 4R, 4G and 4B is determined in the same manner as the embodiment 1, and the light beams of the respective colors are thus released from the dichroic mirrors 4R, 4G and 4B with angles that offset by 2θ respectively.

Moreover, the projection-type color liquid crystal display is provided with a liquid crystal display element 37 that has the same micro-lens array 5 as the embodiment 3. This liquid crystal display element 37 is of the simple-matrix type, and has signal electrodes corresponding to the respective colors that are formed in the shape of stripes. In this liquid crystal display element 37, when the pixel-array pitch P and the focal distance fμ of the micro-lens array 5 are set in the same manner as the embodiment 1, the light beams, which have divided into the respective colors by the dichroic mirrors 4R, 4G and 4B, are incident on the micro-lens array 5, and then converged onto pixel apertures corresponding to the respective colors in the liquid crystal display element 37.

The light beams, thus modulated by the liquid crystal display element 37, are converged onto a projection lens 45 by a field lens 8. Here, in the present embodiment, the arrangement of the projection lens 45 is different from that of the aforementioned embodiments. In other words, the projection lens 45 is provided with a color filter 46 on its entrance pupil.

As illustrated in FIG. 11, the light beams, after having passed through the liquid crystal display element 37, are converged by the field lens 8 onto the entrance pupil Q of the projection lens 45 that is placed at a position apart from the liquid crystal display element 37 by L. At this time, the light beam of green, which has been normal incident on the micro-lens array 5, is mainly converged onto the optical axis of the field lens 8, and the two light beams (red and blue) other than the normal incident light beam are converged, centered on positions that are apart from the optical axis by H. Here, H is calculated as follows:

$H = L \times \tan 2\theta.$

Figure 12A:
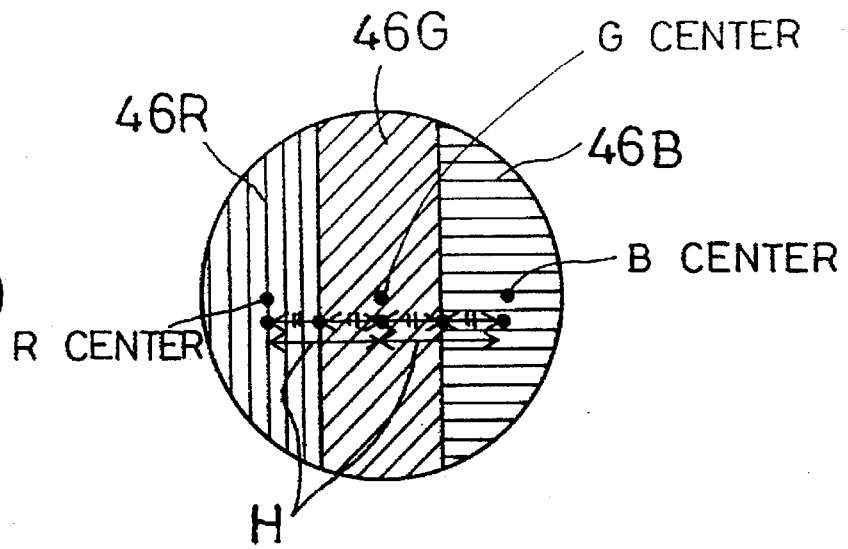
FIGS. 12(a) and 12(b) are schematic illustrations, each showing a color filter that is placed on the entrance pupil of the projection lens installed in the projection-type color liquid crystal display of FIG. 10.

As shown in FIG. 12(a), the color filter 46, disposed on the entrance pupil Q of the projection lens 45, is provided with areas 46R, 46G and 46B that respectively transmit the light beams having the red, green and blue wavelength ranges. These areas 46R, 46G and 46B are formed on a glass substrate that is coated with a reflection-reduction coating. The areas 46R, 46G and 46B are arranged so that they are coincident with the converging positions of the respective light beams that are located on the entrance pupil Q in the projection lens 45. Here, FIG. 12(a) is a view that is obtained when the color filter 46 is seen from the screen 10 side.

The borders between the areas 46R, 46G and 46B are arranged so that each border forms a vertical bisector of a line connecting the respective center points (apart from the optical axis by H, as described above) on the entrance pupil Q on which the light beams of the respective colors are incident. When an interference color filter, which is produced by using the same technique as the dichroic mirrors 4R, 4G and 4B, is adopted as the color filter 46, it becomes possible to achieve the light transmittance of nearly 100% in each wavelength range; thus, this arrangement is optimal in terms of brightness. However, since color filters of dye type or pigment-dispersion type are more inexpensive in their production costs, a choice may be made by taking into consideration the balance of the target purity of colors and the costs in each specific case.

In the above-mentioned arrangement, light, which has been emitted from the white-light source 1, is divided into light beams of the respective colors by the dichroic mirrors 4R, 4G and 4B. These light beams are incident on the micro-lens array 5 in accordance with the relative angles at which the dichroic mirrors 4R, 4G and 4B are disposed. Further, the light beams, which have been directed from the micro-lens array 5 to the liquid crystal display element 37, are modulated by the liquid crystal display element 37, and illuminated onto the screen 10 by the field lens 8 and the projection lens 45. Since the color filter 46 is disposed on the projection lens 45, stray light, etc., which have been caused by the dichroic mirrors 4R, 4G and 4B, are eliminated when the light beams pass through the projection lens 45, and only the light beams having high purity in colors are illuminated onto the screen 10, thereby displaying full-color images.

As described earlier, one of the conventional problems is that stray light, caused by the dichroic mirrors, is also illuminated onto the screen and the color reproducibility is thus adversely affected. Here, in the present embodiment, the color filter 46, which is disposed on the entrance pupil Q of the projection lens 45, makes it possible to eliminate stray light that is mixed in the light beams of red, green and blue. Therefore, the light beams are illuminated onto the screen 10, after having been subjected to correction for color purity by the color filter 46; this improves the purity of each of the three primary colors as well as improving the color reproducibility of illuminated images. Moreover, this arrangement eliminates the necessity of having to design the dichroic mirrors 4R, 4G and 4B with great care while taking into consideration their characteristics for wavelength separation, as well as eliminating the necessity of having to provide an anti-reflection treatment onto the backsides of the dichroic mirrors 4G and 4B. Thus, it become possible to reduce the costs of production.

[EMBODIMENT 7]

Referring to FIGS. 3, 10 and 12 as well as FIG. 13, the following description will discuss still another embodiment of the present invention. Here, for convenience of explanation, those members that have the same functions and that are described in the aforementioned embodiments with reference to their drawings are indicated by the same reference numerals and the description thereof is omitted.

Although the projection-type color liquid crystal display of the present invention has a construction as shown in FIG. 10 virtually in the same manner as the embodiment 6, it is provided with an active-matrix-type liquid crystal display element as the liquid crystal display element 37 in the same manner as the embodiment 2.

In the present embodiment, the orientation of the arc in the white-light source 1 is disposed in parallel with the surface of FIG. 10. The pixel array in the liquid crystal display element 37 is a delta-array in the same manner as the embodiment 2. As to the micro-lens array 5 installed in the liquid crystal display element 37, the shape of each micro-lens does not need to be analogous to the shape of a set of the corresponding pixels; therefore, the shapes as shown in FIGS. 3(a), 3(b) and 3(d) may be adopted. However, in the case of using the micro-lens array 5 shown in FIG. 3(b) consisting of hexagonal micro-lenses 33, it is necessary to arrange the dichroic mirrors 4R, 4G and 4B so that the directions of their face normals are tilted with respect to the surface of FIG. 10.

Figure 12B:
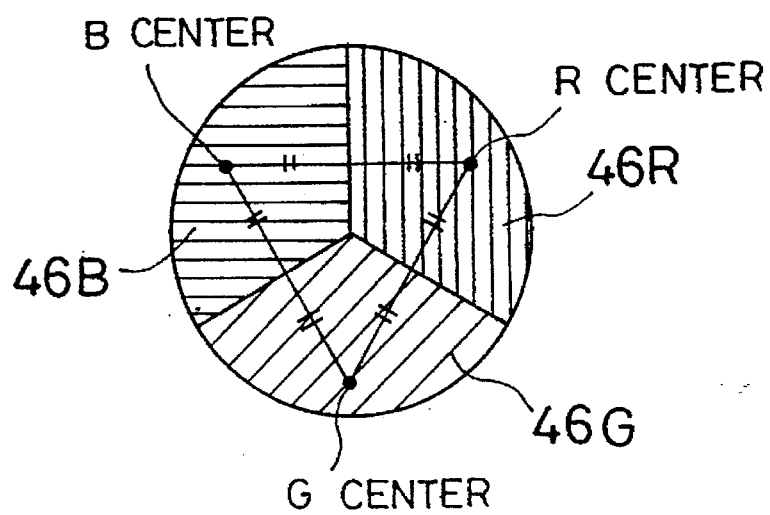

Here, in the case of using the micro-lens array that has the shape shown in FIG. 3(a) or FIG. 3(d), the layout of the colors in the color filter 46 is the same as that of the embodiment 6 as shown in FIG. 12(a). In contrast, in the case of using the micro-lens array that has the shape shown in FIG. 3(b), the layout of the colors in the color filter 46 is set as shown in FIG. 12(b) in accordance with the arrangement of the micro-lens. In this case also, the borders between the areas 46R, 46G and 46B are arranged so that each border forms a vertical bisector of a line connecting the respective center points on the entrance pupil Q of the projection lens 45 on which the light beams of the respective colors are converged.

In the above-mentioned arrangement, light, which has been emitted from the white-light source 1, is divided into light beams of the respective colors by the dichroic mirrors 4R, 4G and 4B. These light beams are incident on the micro-lens array 5 in accordance with the relative angles at which the dichroic mirrors 4R, 4G and 4B are disposed. Further, the light beams, which have been directed from the micro-lens array 5 to the liquid crystal display element 37, are modulated by the liquid crystal display element 37, and illuminated onto the screen 10 by the field lens 8 and the projection lens 45. Since the color filter 46 is disposed on the projection lens 45, stray light, etc., which have been caused by the dichroic mirrors 4R, 4G and 4B, are eliminated when the light beams pass through the projection lens 45, and only the light beams having high purity in colors are illuminated onto the screen 10, thereby displaying full-color images.

Therefore, in the present embodiment also, the color filter 46 makes it possible to eliminate the influence of stray light caused by multiple reflection in the dichroic mirrors 4R, 4G and 4B, thereby achieving the same effects as the embodiment 6.

Moreover, the above-mentioned embodiments 6 and 7 are effectively applied to a case where the illuminating light has a poor light expand angle (that is, in the case of a large expanding angle of light beam). As the light expand angle of the illuminating light becomes worse, the diameter of the converged light spot on the micro-lens array 5 is increased as has been indicated by the equation (2) in the embodiment 1. When the light expand angle of the illuminating light is too poor, the light beams having the divided colors of red, green and blue tend to enter pixel apertures that are associated with other colors, even after they are converged by the micro-lens array 5, thereby causing mixed colors.

Furthermore, the dichroic mirrors 4R, 4G and 4B have fluctuated wavelength characteristics in their reflected light beams or transmitted light beams depending on the incident angles of light. For this reason, when a light beam is incident thereon at an angle that is different from the designed incident angle, the color purity is lowered in the light beams having the respective divided colors, thereby causing poor color reproducibility in the illuminated images.

However, the color filter 46, installed on the entrance pupil Q of the projection lens 45, makes it possible to eliminate these factors causing the adverse effects.

Here, if the adverse effects due to mixed colors of the illuminating light or due to stray light appear only on a specific color (for example, blue), only the area for selecting the wavelength of blue may be formed on the color filter 46. Of course, the wavelength-selecting areas for covering two colors may be provided on the color filter 46 for the same reason as given above.

As to the shapes of the wavelength selector, they are not limited to those shown in the aforementioned embodiments: any shape may be adopted in accordance with the shape of a light beam that actually appears on the entrance pupil. For example, when the micro-lens arrays as described in the embodiment 7 by reference to FIGS. 3(b) and 3(d) are adopted, light spots, each of which has a hexagonal shape that is similar to the shape of each micro-lens, appear on the converged-light centers of the respective colors on the entrance pupil of the projection lens. Accordingly, as shown in FIGS. 13(a) and 13(b), the areas 46R, 46G and 46B in the color filter 46 may be formed into a hexagonal shape having the same size as that formed by each light beam.

Figure 13A:
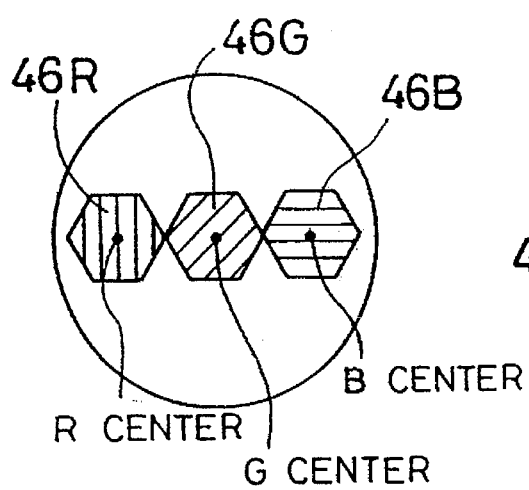
FIGS. 13(a) and 13(b) are schematic illustrations, each showing a color a filter that is placed on the entrance pupil of the projection lens installed in the projection-type color liquid crystal display of FIG. 10.
Figure 13B:
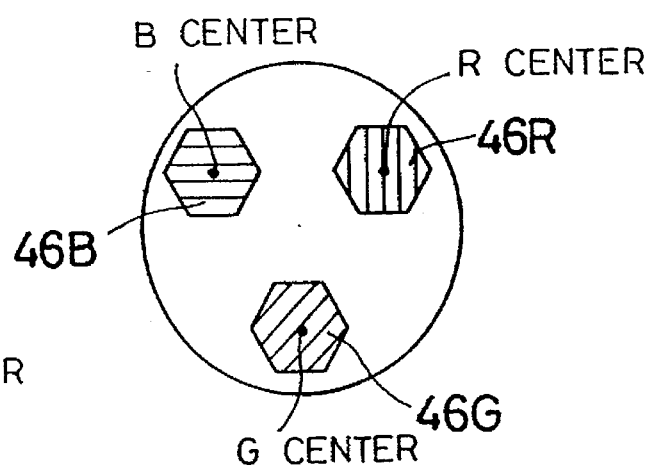
Figure 14:
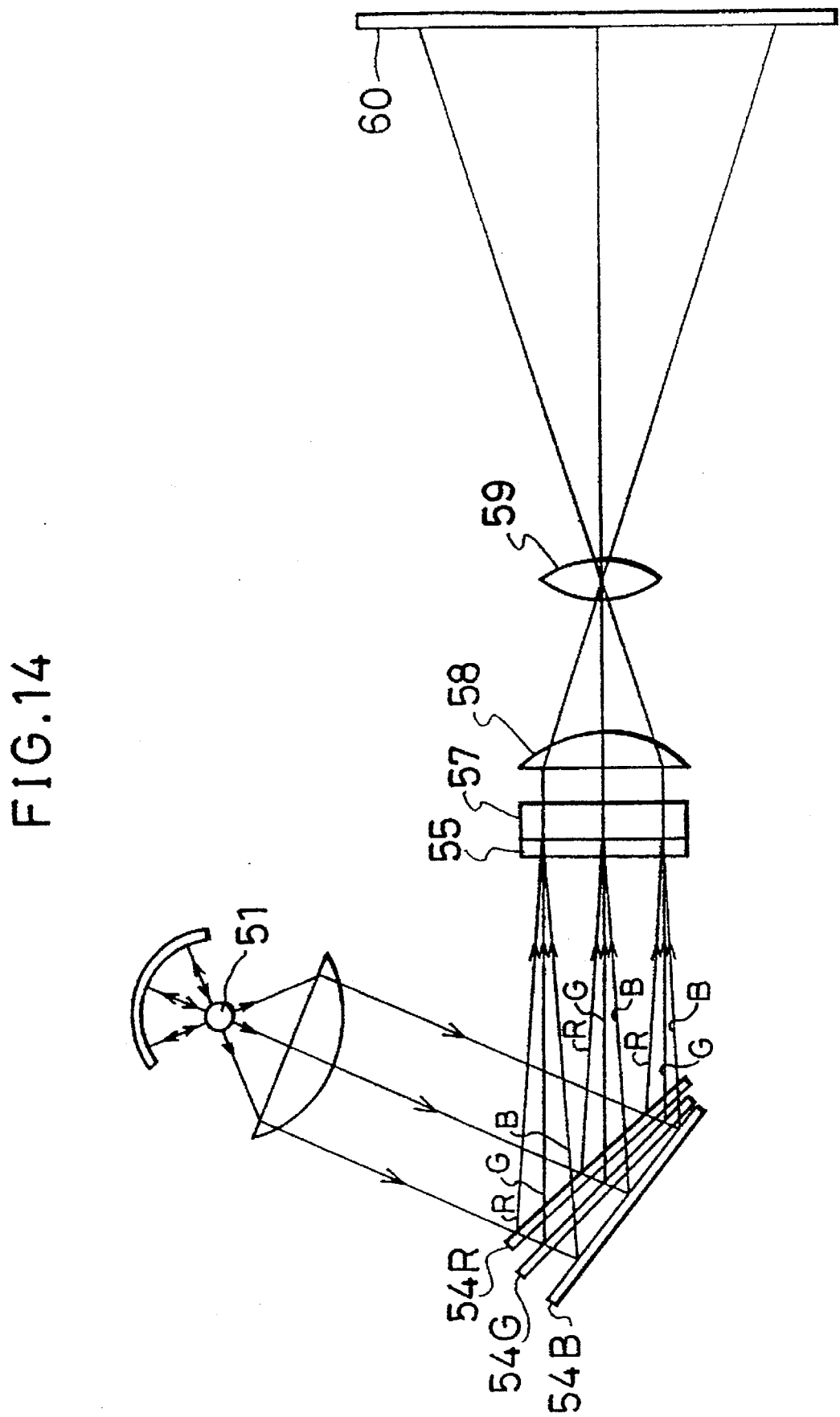
FIG. 14 is a schematic illustration showing a construction of a conventional projection-type color liquid crystal display.
Figure 15:
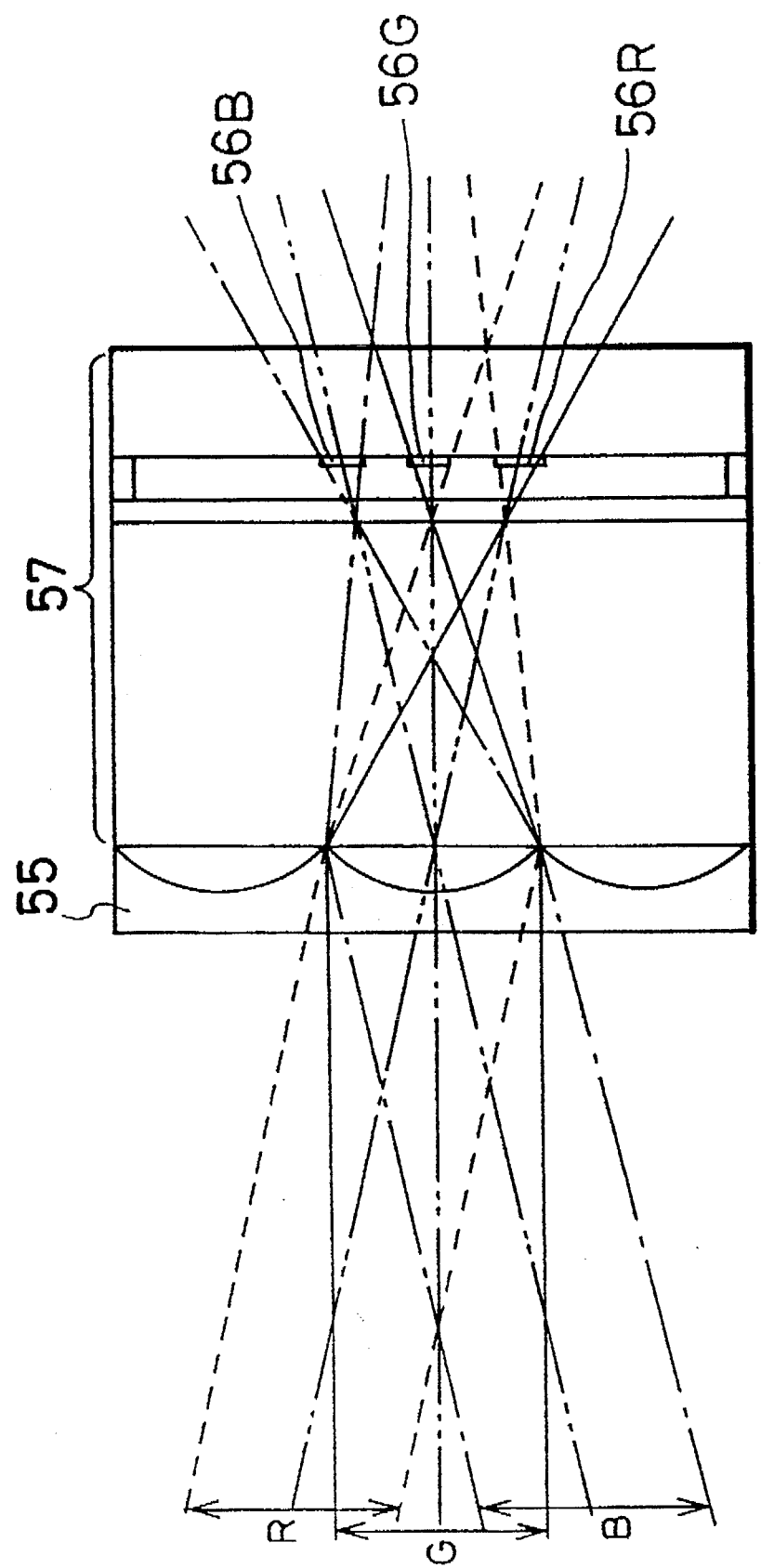
FIG. 15 is a cross-sectional view showing liquid crystal elements and a micro-lens array that are installed in the projection-type color liquid crystal display of FIG. 14.
Figure 16A:
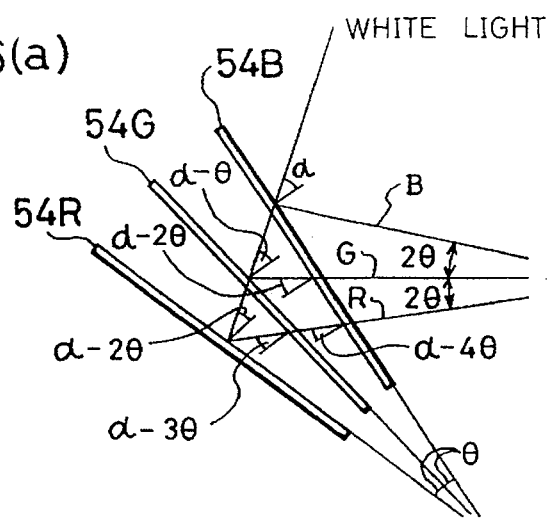
FIG. 16(a) is a schematic illustration showing a separated state of light due to dichroic mirrors that are installed in the projection-type color liquid crystal display of FIG. 14.
Figure 16B:
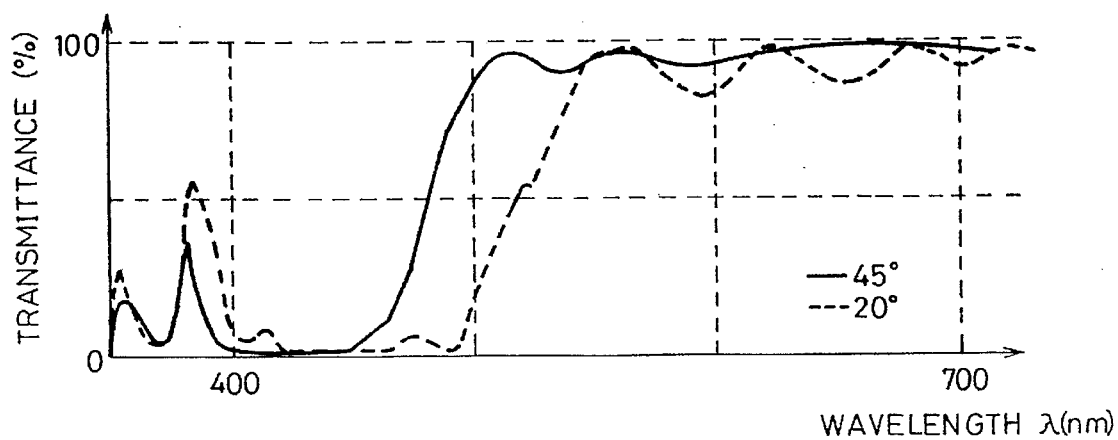
FIG. 16(b) is a graph showing spectral characteristics of the dichroic mirror for blue-reflection use.
Figure 17A:
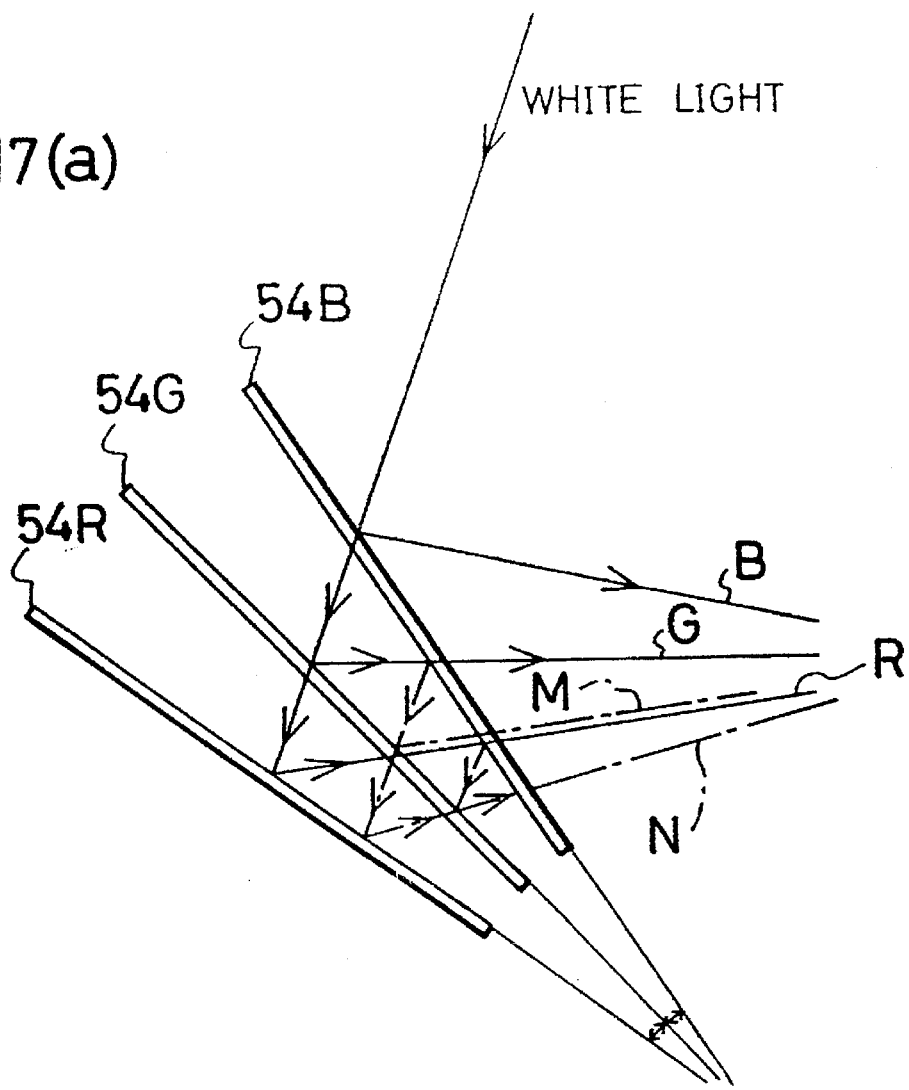
FIG. 17(a) is a schematic illustration showing a state where stray light is exerted on the dichroic mirrors of FIG. 16(a)
Figure 17B:
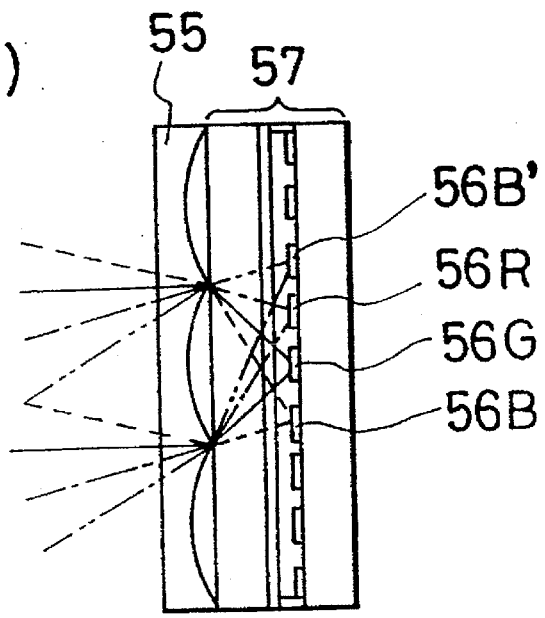
FIG. 17(b) is a cross-sectional view of the liquid crystal elements and the micro-lens array on which the stray light is incident.

More specifically, in the case of using the micro-lens array as shown in FIG. 3(b), the shape of the areas 46a, 46b and 46c may be formed as shown in FIG. 13(b); and in the case of using the micro-lens array as shown in FIG. 3(d), the shape of the areas 46a, 46b and 46c may be formed as shown in FIG. 13(a). Additionally, in the color filter 46, portions other than the areas 46a, 46b and 46c shown in FIGS. 13(a) and 13(b) may be transparent; or if mixed colors tend to occur for some other reasons, they may be provided as light-shielding portions.

Here, whatever shape the wavelength-selecting areas in the color filter 46 may take, there is no possibility of the borders of the respective areas casting shadows on the illuminated images, from the point of view of the image-focusing principle in lenses.

Additionally, it is possible to apply the second micro-lens array 6 to the liquid crystal display elements 37 that are provided in the projection-type color liquid crystal displays of the embodiments 3 through 5, in the same manner as the embodiment 1. In such cases, the same effects as obtained in the embodiment 1 may be obtained together with the effects of the embodiments 3 through 5.

In the embodiments 6 and 7, the mixed colors (decline in purity of colors) that occur in the illuminated images on the screen can be reduced by blocking stray light that is caused in the optical system and light beams having imperfect color separation. Therefore, it is not necessary to be particularly concerned about the order of the placement of the dichroic mirrors in the processes of dividing the light into red, blue and green. However, when the light-beam dividers, which are used in the embodiment 3 through 5, are applied to the projection-type liquid crystal displays of the embodiments 6 and 7, it becomes possible to reduce stray light that is a main cause of the mixed colors to a great degree in its generating phase; this reduces light to be blocked. Thus, keeping the light to be blocked from being generated improves the efficiency of utilization of illuminating light; therefore, in addition to the functions and effects obtained from the embodiments 6 and 7, it becomes possible to make the illuminated images brighter.

In the above-mentioned embodiments, explanations have been given by exemplifying the cases in which a plurality of dichroic mirrors for reflecting light beams having respectively different wavelength ranges are used as the light-beam dividers such that white light is divided into a plurality of light beams. However, the present invention will not be intended to be limited to this arrangement: another arrangement may be adopted wherein white light is divided into a plurality of light beams by adjusting the wavelength ranges of light passing through a mirror.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection-type color liquid crystal display comprising:

a white-light source for emitting a white-light beam;

light-beam dividing means for dividing the white-light beam into light beams consisting of a plurality of color rays having respectively different wavelength ranges;

a liquid crystal display element including a face whereon pixels corresponding to the respective color rays are regularly disposed, said liquid crystal display element being arranged so that the incident color rays are modulated and transmitted through the pixels;

a first micro-lens array for converging the color rays of the light beams onto corresponding pixel apertures in said liquid crystal display element, each color ray being allocated with respect to each wavelength range; and a second micro-lens array for deflecting the light beams so that their respective principal rays are aligned in parallel with one another, a focal distance of said first micro-lens array being designed so that focal points of the light beams that are released from said first micro-lens array are located in a vicinity of a light-releasing side of said second micro-lens array.

2. The projection-type color liquid crystal display as defined in claim 1, wherein said second micro-lens array is disposed between said first micro-lens array and the pixels in said liquid crystal display element in the light path of the color rays.

3. The projection-type color liquid crystal display as defined in claim 1, wherein said liquid crystal display element comprises:

a liquid crystal layer wherein liquid crystal is sealed;

a plurality of scanning electrodes that transmit light, said scanning electrodes being disposed in parallel with one another between said liquid crystal layer and said second micro-lens array; and a plurality of signal electrodes that transmit light, said signal electrodes being disposed in parallel with one another in a direction orthogonal to said scanning electrodes and on said liquid crystal layer on a side opposite to said scanning electrodes, said first micro-lens array and said second micro-lens array respectively comprising a transparent substrate for transmitting light, and a plurality of lenticular lenses disposed on said transparent substrate with an axis of each lenticular lens coinciding with a lengthwise direction of said signal electrodes, each lenticular lens being in an operative relationship with adjacent signal electrodes of a number which is equal to a number of colors of the color rays.

4. A projection-type color liquid crystal display comprising:

a white-light source for emitting a white-light beam;

light-beam dividing means for dividing the white-light beam into light beams consisting of a plurality of color rays having respectively different wavelength ranges;

a liquid crystal display element including a face wherein pixels corresponding to the respective color rays are regularly disposed, said liquid crystal display element being arranged so that the incident color rays are modulated and transmitted through the pixels;

a first micro-lens array for converging the color rays of the light beams onto corresponding pixel apertures in said liquid crystal display element, each color ray being allocated with respect to each wavelength range; and a second micro-lens array for deflecting the light beams so that their respective principal rays are aligned in parallel with one another, said second micro-lens array being disposed between said first micro-lens array and the pixels in said liquid crystal display element in the light path of the color rays, said light-beam dividing means divides the white-light beam into light beams consisting of color rays of the three primary colors, said liquid crystal display element has sets of three pixels corresponding to the respective three primary colors of the color rays, each set being arranged so that the three pixels are allocated to apexes of a triangle in a predetermined order, said first micro-lens array and said second microlens array respectively include a transparent substrate that transmits light and a plurality of rectangular micro-lenses that are disposed on the transparent substrate, the plurality of micro-lenses are disposed in a brick-wall fashion, when seen from an optical-axis direction, each of the plurality of micro-lenses being in an operative relationship with a set of three pixels that are adjacent and aligned in a straight line.

5. The projection-type color liquid crystal display as defined in claim 4, which satisfies $P = f \times \tan\theta,$ wherein $\theta$ represents a difference between incident angles of the color rays that are incident on said first micro-lens array; P represents pitch between the pixels that respectively correspond to the color rays in said liquid crystal element; and f represents focal distance of said first micro-lens array.

6. A projection-type color liquid crystal display comprising:

a white-light source for emitting a white-light beam;

light-beam dividing means for dividing the white-light beam into light beams consisting of a plurality of color rays having respectively different wavelength ranges;

a liquid crystal display element including a face wherein pixels corresponding to the respective color rays are regularly disposed, said liquid crystal display element being arranged so that the incident color rays are modulated and transmitted through the pixels;

a first micro-lens array for converging the color rays of the light beams onto corresponding pixel apertures in said liquid crystal display element, each color ray being allocated with respect to each wavelength range; and a second micro-lens array for deflecting the light beams so that their respective principal rays are aligned in parallel with one another, said second micro-lens array being disposed between said first micro-lens array and the pixels in said liquid crystal display element in the light path of the color rays, said light-beam dividing means divides the white-light beam into light beams consisting of color rays of the three primary colors, said liquid crystal display element has sets of three pixels corresponding to the respective three primary colors, each set being arranged so that the three pixels are allocated to apexes of a triangle in a predetermined order, said first micro-lens array and said second microlens array respectively include a transparent substrate that transmits light and a plurality of hexagonal micro-lenses that are disposed on the transparent substrate, the plurality of hexagonal micro-lenses are disposed in a honey-comb shape, when seen from an optical-axis direction, each of the plurality of hexagonal micro-lenses being in an operative relationship with a set of three pixels that are arranged adjacent to each other so that the three pixels are allocated to the apexes of a triangle.

7. The projection-type color liquid crystal display as defined in claim 6, wherein the hexagonal micro-lenses are formed by closely combining circumferential edges of adjacent spherical lenses with one another.

8. The projection-type color liquid crystal display as defined in claim 6, which satisfies $$P = f \times \tan\theta,$$

wherein θ represents a difference between incident angles of the color rays that are incident on said first micro-lens array; P represents pitch between the pixels that respectively correspond to the color rays in said liquid crystal element; and f represents focal distance of said first micro-lens array.

9. A projection-type color liquid crystal display comprising:

a white-light source for emitting a white-light beam;

light-beam dividing means for dividing the white-light beam into light beams consisting of a plurality of color rays having respectively different wavelength ranges;

a liquid crystal display element including a face wherein pixels corresponding to the respective color rays are regularly disposed, said liquid crystal display element being arranged so that the incident color rays are modulated and transmitted through the pixels;

a first micro-lens array for converging the color rays of the light beams onto corresponding pixel apertures in said liquid crystal display element, each color ray being allocated with respect to each wavelength range; and a second micro-lens array for deflecting the light beams so that their respective principal rays are aligned in parallel with one another, said second micro-lens array being disposed between said first micro-lens array and the pixels in said liquid crystal display element in the light path of the color rays, said light-beam dividing means divides the white-light beam into light beams consisting of color rays of the three primary colors, said liquid crystal display element has sets of three pixels corresponding to the respective three primary colors of the color rays, each set being arranged so that the three pixels are allocated to apexes of a triangle in a predetermined order, said first micro-lens array includes a transparent substrate that transmits light and a plurality of hexagonal micro-lenses that are disposed on the transparent substrate, the plurality of hexagonal micro-lenses are disposed in a honey-comb shape, when seen from an optical-axis direction, each of the plurality of hexagonal micro-lenses being in an operative relationship with a set of three pixels that are adjacent and aligned in a straight line, said second micro-lens array includes a corresponding transparent substrate that transmits light and a plurality of rectangular micro-lenses that are disposed on the corresponding transparent substrate, the plurality of rectangular micro-lenses are disposed in a brick-wall fashion, when seen from the optical-axis direction, each of the plurality of rectangular micro-lenses being in an operative relationship with a set of three pixels that are adjacent and aligned in a straight line.

10. The projection-type color liquid crystal display as defined in claim 9, wherein the plurality of hexagonal micro-lenses are formed by fusing circumferential edges of adjacent spherical lenses with one another.

11. The projection-type color liquid crystal display as defined in claim 9, which satisfies $$P = f \times \tan\theta,$$

wherein θ represents a difference between incident angles of the color rays that are incident on said first micro-lens array; P represents pitch between the pixels that respectively correspond to the color rays in said liquid crystal element; and f represents focal distance of said first micro-lens array.

12. A projection-type color liquid crystal display comprising:

a white-light source for emitting a white-light beam;

light-beam dividing means for extracting a plurality of color rays having respectively different wavelength ranges from the white-light beam in an order of greater wavelength ranges starting from a longest wavelength and for reducing transmittance of stray light in the extracted plurality of color rays;

a liquid crystal display element on which the color rays are incident and through which the color rays are modulated;

a micro-lens array for converging the color rays onto corresponding pixel apertures in said liquid crystal display element, each color ray being allocated with respect to each wavelength range; and projection means for projecting the color rays that have been modulated by said liquid crystal display element.

13. The projection-type color liquid crystal display as defined in claim 12, wherein said light-beam dividing means comprises:

a plurality of dichroic mirrors that are disposed on an optical axis of the white-light beam with respectively different angles with respect to the optical axis, said dichroic mirrors respectively being provided with such spectral characteristics that a first dichroic mirror of said dichroic mirrors in which the white-light beam from said white-light source is incident on first reflects light having a wavelength range located near the longest wavelength.

14. The projection-type color liquid crystal display as defined in claim 13, wherein said dichroic mirrors include at least said first dichroic mirror for reflecting a red ray, a second dichroic mirror for reflecting a yellow ray and a third dichroic mirror for reflecting a blue ray.

15. The projection-type color liquid crystal display as defined in claim 13, wherein said dichroic mirrors are arranged so that said first dichroic mirror has an optical axis that tilts on a predetermined angle with respect to an incident direction of the white-light beam, respective angles between adjacent ones of said dichroic mirrors being equal to one another.

16. The projection-type color liquid crystal display as defined in claim 13, wherein said dichroic mirrors include at least said first dichroic mirror for reflecting a red ray, a second dichroic mirror for reflecting a green ray and a third dichroic mirror for reflecting a blue ray.

17. The projection-type color liquid crystal display as defined in claim 12, further comprising:

an additional micro-lens array for deflecting the light beams so that respective principal rays as deflected are aligned in parallel with one another.

18. A projection-type color liquid crystal display comprising:

a white-light source for emitting a white-light beam;

light-beam dividing means for dividing the white-light beam into light beams consisting of color rays having respectively different wavelength ranges;

a liquid crystal display element on which the color rays are incident and through which the color rays are modulated and transmitted;

a screen;

a projection lens for projecting onto said screen the color rays that have been modulated by said liquid crystal display element; and wavelength selection means having selection areas that transmit only rays having wavelength ranges corresponding respectively to the color rays, said wavelength selection means being mounted on an entrance pupil of said projection lens.

19. The projection-type color liquid crystal display as defined in claim 18, wherein said light-beam dividing means divides the white-light beam into light beams consisting of color rays of the three primary colors, said wavelength selection means is a round color filter having areas that include incident-light spots respectively corresponding to the color rays, the areas having borders, each border forming a vertical bisector of each line connecting respective center points of the incident-light spots of the respective color rays on the entrance pupil of said projection lens.

20. The projection-type color liquid crystal display as defined in claim 18, wherein said wavelength selection means is an interference color filter.

21. The projection-type color liquid crystal display as defined in claim 18, wherein said wavelength selection means is a color filter of a dye type.

22. The projection-type color liquid crystal display as defined in claim 18, wherein said wavelength selection means is a color filter of a pigment dispersion type.

23. The projection-type color liquid crystal display as defined in claim 18, wherein said wavelength selection means has wavelength selection areas respectively corresponding to the color rays, the wavelength selection areas having a shape analogous to areas on the entrance pupil to which the corresponding color rays are illuminated.

24. The projection-type color liquid crystal display as defined in claim 23, wherein areas other than the wavelength selection areas in said wavelength selection means are transparent areas that transmit light.

25. The projection-type color liquid crystal display as defined in claim 23, wherein areas other than the wavelength selection areas in said wavelength selection means are light-shielding areas that shield light.

26. A projection-type color liquid crystal display comprising:

a white-light source for emitting a white-light beam;

light-beam dividing means for dividing the white-light beam into light beams consisting of a plurality of color rays by extracting the color rays having respectively different wavelength ranges from the white-light beam in an order of greater wavelength ranges starting from a longest wavelength a liquid crystal display element on which the color rays are incident and through which the color rays are modulated and transmitted;

a screen;

a projection lens for projecting onto said screen the color rays that have been modulated by said liquid crystal display element; and wavelength selection means having selection areas that transmit only rays having wavelength ranges corresponding to the respective color rays, said wavelength selection means being installed on an aperture diaphragm of the projection lens.

27. The projection-type color liquid crystal display as defined in claim 26, further comprising:

a polarizing plate mounted on an incident side of said liquid crystal display element on which the color rays are incident; and polarization-axis rotating means for rotating a polarization axis of either p-state polarization or s-state polarization to a direction in which the polarization axis is coincident with a transmitting axis of said polarizing plate, said polarization-axis rotating means being mounted between said light-beam dividing means and said polarizing plate, said light-beam dividing means having a plurality of dichroic mirrors with spectral characteristics set for the polarization effected by said polarization-axis rotating means.

28. A projection-type color liquid crystal display comprising:

a white-light source for emitting a white-light beam;

light-beam dividing means for extracting a plurality of color rays having respectively different wavelength ranges from the white-light beam in an order of greater wavelength ranges starting from a longest wavelength;

a liquid crystal display element on which the color rays are incident and through which the color rays are modulated;

a micro-lens array for converging the color rays onto corresponding pixel apertures in said liquid crystal display element, each color ray being allocated with respect to each wavelength range;

projection means for projecting the color rays that have been modulated by said liquid crystal display element; and correcting means for reducing rays having yellow and cyan wavelength ranges with respect to spectral characteristics of said white-light source.

29. The projection-type color liquid crystal display as defined in claim 28, wherein said light-beam dividing means comprises:

a plurality of dichroic mirrors that are disposed on an optical axis of the white-light beam with respectively different angles with respect to the optical axis, said dichroic mirrors respectively being provided with such spectral characteristics that a first dichroic mirror of said dichroic mirrors in which the white-light beam from said white-light source is incident on first reflects light having a wavelength range located near the longest wavelength.

30. The projection-type color liquid crystal display as defined in claim 29, wherein said dichroic mirrors are arranged so that said first dichroic mirror has an optical axis that tilts on a predetermined angle with respect to an incident direction of the white-light beam, respective angles between adjacent ones of said dichroic mirrors being equal to one another.

31. The projection-type color liquid crystal display as defined in claim 29, wherein said dichroic mirrors include at least said first dichroic mirror for reflecting a red ray, a second dichroic mirror for reflecting a green ray and a third dichroic mirror for reflecting a blue ray.

32. The projection-type color liquid crystal display as defined in claim 29, wherein said dichroic mirrors include at least said first dichroic mirror for reflecting a red ray, a second dichroic mirror for reflecting a yellow ray and a third dichroic mirror for reflecting a blue ray.

33. The projection-type color liquid crystal display as defined in claim 28, wherein said light-beam dividing means comprises:

a plurality of dichroic mirrors that are disposed on an optical axis of the white-light beam with respectively different angles with respect to the optical axis; and a full-reflective mirror for reflecting light that has passed through all of said dichroic mirrors, said dichroic mirrors respectively being provided with spectral characteristics such that a first dichroic mirror of said dichroic mirrors of which the light beam from said white-light source is first incident on reflects light having a longest wavelength.

34. The projection-type color liquid crystal display as defined in claim 33, wherein said dichroic mirrors include at least said first dichroic mirror for reflecting a red ray and a second dichroic mirror for reflecting a yellow ray.

35. The projection-type color liquid crystal display as defined in claim 28, further comprising:

a polarizing plate mounted on an incident side of said liquid crystal display element on which the color rays are incident; and polarization-axis rotating means for rotating a polarization axis of either p-state polarization or s-state polarization to a direction in which the polarization axis is coincident with a transmitting axis of said polarizing plate, said polarization-axis rotating means being mounted between said light-beam dividing means and said polarizing plate, said light-beam dividing means having a plurality of dichroic mirrors with spectral characteristics set for the polarization effected by said polarization-axis rotating means.

36. The projection-type color liquid crystal display as defined in claim 35, wherein said polarization-axis rotating means includes a half-wave plate.

37. The projection-type color liquid crystal display as defined in claim 35, wherein said polarization-axis rotating means includes liquid crystal.

38. The projection-type color liquid crystal display as defined in claim 28, further comprising:

an additional micro-lens array for deflecting the light beams so that respective principal rays as deflected are aligned in parallel with one another.

39. A projection-type color liquid crystal display comprising:

a white-light source for emitting a white-light beam;

light-beam dividing means for extracting a plurality of color rays having respectively different wavelength ranges from the white-light beam in an order of greater wavelength ranges starting from a longest wavelength;

a liquid crystal display element on which the color rays are incident and through which the color rays are modulated;

a micro-lens array for converging the color rays onto corresponding pixel apertures in said liquid crystal display element, each color ray being allocated with respect to each wavelength range;

projection means for projecting the color rays that have been modulated by said liquid crystal display element;

a polarizing plate mounted on an incident side of said liquid crystal display element on which the color rays are incident; and polarization-axis rotating means for rotating a polarization axis of either p-state polarization or s-state polarization to a direction in which the polarization axis is coincident with a transmitting axis of said polarizing plate, said polarization-axis rotating means being mounted between said light-beam dividing means and said polarizing plate, said light-beam dividing means having a plurality of dichroic mirrors with spectral characteristics set for the polarization effected by said polarization-axis rotating means.

40. The projection-type color liquid crystal display as defined in claim 39, wherein said light-beam dividing means comprises:

a plurality of dichroic mirrors that are disposed on an optical axis of the white-light beam with respectively different angles with respect to the optical axis, said dichroic mirrors respectively being provided with spectral characteristics such that a first dichroic mirror of said dichroic mirrors on which the white-light beam from said white-light source is incident on first reflects light having a wavelength range located near the longest wavelength.

41. The projection-type color liquid crystal display as defined in claim 40, wherein said dichroic mirrors are arranged so that said first dichroic mirror has an optical axis that tilts on a predetermined angle with respect to an incident direction of the white-light beam, respective angles between adjacent ones of said dichroic mirrors being equal to one another.

42. The projection-type color liquid crystal display as defined in claim 40, wherein said dichroic mirrors include at least said first dichroic mirror for reflecting a red ray, a second dichroic mirror for reflecting a green ray and a third dichroic mirror for reflecting a blue ray.

43. The projection-type color liquid crystal display as defined in claim 40, wherein said dichroic mirrors include at least said first dichroic mirror for reflecting a red ray, a second dichroic mirror for reflecting a yellow ray and a third dichroic mirror for reflecting a blue ray.

44. The projection-type color liquid crystal display as defined in claim 39, wherein said light-beam dividing means comprises:

a plurality of dichroic mirrors that are disposed on an optical axis of the white-light beam with respectively different angles with respect to the optical axis; and a full-reflective mirror for reflecting light that has passed through said dichroic mirrors, said dichroic mirrors respectively being provided with spectral characteristics such that a first dichroic mirror of said dichroic mirrors on which the white-light beam from said white-light source is incident on first reflects light having a longest wavelength.

45. The projection-type color liquid crystal display as defined in claim 44, wherein said dichroic mirrors include at least said first dichroic mirror for reflecting a red ray and a second dichroic mirror for reflecting a yellow ray.

46. The projection-type color liquid crystal display as defined in claim 39, wherein said polarization-axis rotating means includes a half-wave plate.

47. The projection-type color liquid crystal display as defined in claim 39, wherein said polarization-axis rotating means includes liquid crystal.

48. The projection-type color liquid crystal display as defined in claim 39, further comprising:

an additional micro-lens array for deflecting the light beams so that respective principal rays as deflected are aligned in parallel with one another.

* * * * *